(12) United States Patent
Takahashi et al.

(10) Patent No.: US 11,074,392 B2
(45) Date of Patent: Jul. 27, 2021

(54) INFORMATION PROCESSING APPARATUS AND NON-TRANSITORY COMPUTER READABLE MEDIUM FOR SWITCHING BETWEEN AN ATTRIBUTE INFORMATION MODE AND AN IMAGE INFORMATION MODE

(71) Applicant: FUJIFILM BUSINESS INNOVATION CORP., Tokyo (JP)

(72) Inventors: Kiyoshi Takahashi, Kanagawa (JP); Yutaka Ikeda, Kanagawa (JP); Kazuhide Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/553,685

(22) Filed: Aug. 28, 2019

(65) Prior Publication Data

US 2020/0272688 A1 Aug. 27, 2020

(30) Foreign Application Priority Data

Feb. 27, 2019 (JP) .............................. JP2019-034076

(51) Int. Cl.
*G06F 40/106* (2020.01)
*G06F 40/186* (2020.01)

(52) U.S. Cl.
CPC .......... *G06F 40/106* (2020.01); *G06F 40/186* (2020.01); *G06K 2209/01* (2013.01)

(58) Field of Classification Search
CPC .................................................. G06F 40/106
See application file for complete search history.

(56) References Cited

U.S. PATENT DOCUMENTS

| 7,475,362 | B2 | 1/2009 | Fujiyoshi | |
|---|---|---|---|---|
| 9,373,066 | B2 * | 6/2016 | Iwadate | ................. G06K 15/40 |
| 2003/0156479 | A1 * | 8/2003 | Fujiyoshi | ............ G06F 3/04817 365/200 |
| 2007/0229491 | A1 * | 10/2007 | Saitoh | ................. H04N 1/00442 345/418 |
| 2008/0148176 | A1 * | 6/2008 | Mita | ...................... G06F 16/58 715/781 |
| 2008/0235612 | A1 * | 9/2008 | Nakagawa | ............ G06F 3/1205 715/772 |
| 2008/0307363 | A1 * | 12/2008 | Jalon | ..................... G06F 16/168 715/835 |
| 2009/0007019 | A1 * | 1/2009 | Kobayashi | ......... H04N 1/00244 715/838 |

(Continued)

FOREIGN PATENT DOCUMENTS

| JP | 2003-67295 A | 3/2003 |
|---|---|---|
| JP | 2003-308200 A | 10/2003 |
| JP | 2013-20454 A | 1/2013 |

*Primary Examiner* — Asher D Kells
(74) *Attorney, Agent, or Firm* — Oliff PLC

(57) ABSTRACT

An information processing apparatus includes: an acquisition unit that acquires information from an external apparatus that stores data; and a switching unit that, for each item of the data, switches between a first mode in which the acquisition unit acquires attribute information of the data from the external apparatus, and a second mode in which the acquisition unit acquires, from the external apparatus, information for displaying an image that indicates a feature of the data.

12 Claims, 18 Drawing Sheets

(56) References Cited

U.S. PATENT DOCUMENTS

| | | | |
|---|---|---|---|
| 2009/0235155 A1* | 9/2009 | Ueda | G06F 40/169 |
| | | | 715/233 |
| 2013/0132908 A1* | 5/2013 | Lee | H04N 21/8153 |
| | | | 715/838 |
| 2014/0337322 A1* | 11/2014 | Cho | G06F 16/738 |
| | | | 707/722 |

* cited by examiner

FIG. 5

| NAME | FINANCIAL INSTITUTION NAME |
|---|---|
| FORMAT | ONE-LINE CHARACTER STRING FRAME |
| COORDINATES | 645, 517, 615, 192 |
| INPUT TYPE | CHARACTER STRING |

FIG. 7

| ID | NAME | UPDATE DATE AND TIME | SIZE | DATA FORMAT | OTHERS |
|---|---|---|---|---|---|
| 1 | taskAAA-formBBB_0004.xdw | 11/15/2018 13:27 | 474 BYTES | ... DOCUMENT | ...... |
| 2 | taskAAA-formBBB_0005.xdw | 11/17/2018 15:41 | 480 BYTES | ... DOCUMENT | ...... |
| 3 | taskAAA-formBBB_0006.xdw | 11/18/2018 11:15 | 465 BYTES | ... DOCUMENT | ...... |
| 4 | taskAAA-formBBB_0007.xdw | 11/18/2018 13:20 | 470 BYTES | ... DOCUMENT | |

58

UPDATE  CLOSE  HELP

FIG. 16

| ID | NAME | UPDATE DATE AND TIME | SIZE | DATA FORMAT | OTHERS |
|---|---|---|---|---|---|
| 1 | taskAAA-formBBB_0004.xdw | 11/15/2018 13:27 | 474 BYTES | ... DOCUMENT | ...... |
| 2 | taskAAA-formBBB_0005.xdw | 11/17/2018 15:41 | 480 BYTES | ... DOCUMENT | ...... |

76

78

80

82

3: taskAAA-formBBB_0006.xdw

84

4: taskAAA-formBBB_0007.xdw

UPDATE   CLOSE   HELP

FIG. 17

| ID | NAME | UPDATE DATE AND TIME | SIZE | DATA FORMAT | OTHERS |
|---|---|---|---|---|---|
| 1 | taskAAA-formBBB_0004.xdw | 11/15/2018 13:27 | 474 BYTES | ... DOCUMENT | ...... |
| 2 | taskAAA-formBBB_0005.xdw | 11/17/2018 15:41 | 480 BYTES | ... DOCUMENT | ...... |

3: taskAAA-formBBB_0006.xdw

4: taskAAA-formBBB_0007.xdw

[ UPDATE ]  [ CLOSE ]  [ HELP ]

FIG. 18

| ID | NAME | UPDATE DATE AND TIME | SIZE | DATA FORMAT | OTHERS |
|----|------|---------------------|------|-------------|--------|
| 1 | taskAAA-formBBB_0004.xdw | 11/15/2018 13:27 | 474 BYTES | ... DOCUMENT | ...... |
| 2 | taskAAA-formBBB_0005.xdw | 11/17/2018 15:41 | 480 BYTES | ... DOCUMENT | ...... |

3: taskAAA-formBBB_0006.xdw

4: taskAAA-formBBB_0007.xdw

[ UPDATE ] [ CLOSE ] [ HELP ]

FIG. 19

| ID | NAME | UPDATE DATE AND TIME | SIZE | DATA FORMAT | OTHERS |
|---|---|---|---|---|---|
| 1 | taskAAA-formBBB_0004.xdw | 11/15/2018 13:27 | 474 BYTES | ... DOCUMENT | ...... |
| 2 | taskAAA-formBBB_0005.xdw | 11/17/2018 15:41 | 480 BYTES | ... DOCUMENT | ...... |

78

80

94

3: taskAAA-formBBB_0006.xdw

96

4: taskAAA-formBBB_0007.xdw

76

[ UPDATE ]  [ CLOSE ]  [ HELP ]

INFORMATION PROCESSING APPARATUS AND NON-TRANSITORY COMPUTER READABLE MEDIUM FOR SWITCHING BETWEEN AN ATTRIBUTE INFORMATION MODE AND AN IMAGE INFORMATION MODE

CROSS-REFERENCE TO RELATED APPLICATIONS

This application is based on and claims priority under 35 USC 119 from Japanese Patent Application No. 2019-034076 filed Feb. 27, 2019, which is incorporated herein by reference.

BACKGROUND

(i) Technical Field

The present disclosure relates to an information processing apparatus and a non-transitory computer readable medium.

(ii) Related Art

There are cases where data stored in an external apparatus such as a server is acquired and the content, attribute information, or the like of the data is displayed.

Japanese Unexamined Patent Application Publication No. 2013-20454 describes a document management system in which a rectangular region is extracted from a print image of an electronic document, character information included in the rectangular region is recognized, and the rectangular region and the character information are saved.

Japanese Unexamined Patent Application Publication No. 2003-308200 describes an apparatus that acquires image attributes and print attributes from the attributes of a file, and creates and displays a reduced image in which the print attributes are incorporated as an image, on the basis of the image attributes and the print attributes.

Japanese Unexamined Patent Application Publication No. 2003-67295 describes a server that transmits one image data set composed of multiple items of image data to a terminal apparatus.

SUMMARY

Incidentally, in a case where the attribute information of data is acquired from an external apparatus without the data itself being acquired, and the acquired attribute information is displayed, the communication load may be reduced. However, it is sometimes difficult for a user to comprehend the content of data from only the attribute information. Meanwhile, in a case where an image indicating the features of data is displayed, such as a thumbnail image of the data or the like, it becomes easy for the user to comprehend the content of the data compared to the case where only the attribute information is displayed. However, in order to display an image indicating the features of data, it is necessary to acquire the data from an external apparatus, and the communication load consequently increases.

Aspects of non-limiting embodiments of the present disclosure relate to reducing the communication load compared to a case where data itself is acquired from an external apparatus in a uniform manner regardless of the type of data, and also to making it easy for the user to comprehend the content of data compared to a case where only the attribute information of data is acquired from an external apparatus in a uniform manner.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including: an acquisition unit that acquires information from an external apparatus that stores data; and a switching unit that, for each item of the data, switches between a first mode in which the acquisition unit acquires attribute information of the data from the external apparatus, and a second mode in which the acquisition unit acquires, from the external apparatus, information for displaying an image that indicates a feature of the data.

BRIEF DESCRIPTION OF THE DRAWINGS

An exemplary embodiment of the present disclosure will be described in detail based on the following figures, wherein:

FIG. 5 is a drawing depicting an example of a setting screen;

FIG. 7 is a drawing depicting an example of a screen;

FIG. 16 is a drawing depicting an example of a screen;
FIG. 17 is a drawing depicting an example of a screen;
FIG. 18 is a drawing depicting an example of a screen;
and
FIG. 19 is a drawing depicting an example of a screen.

DETAILED DESCRIPTION

An information processing system according to the present exemplary embodiment will be described hereinafter.

Figure 1:
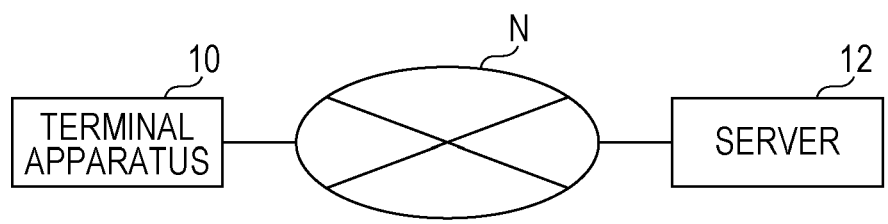
FIG. 1 is a block diagram depicting the configuration of an information processing system according to the present exemplary embodiment.

FIG. 1 depicts an example of the configuration of the information processing system according to the present exemplary embodiment.

The information processing system according to the present exemplary embodiment, as an example, includes a terminal apparatus 10 and a server 12. The terminal apparatus 10 and the server 12 have a function of communicating with each other via a communication path N. The communication path N is a network such as the Internet or a LAN (local area network), for example. It should be noted that multiple terminal apparatuses 10, multiple servers 12, and other apparatuses may be included in the information processing system.

The terminal apparatus 10 is, for example, a personal computer (referred to as a "PC" hereinafter), a tablet PC, a smartphone, a cellular telephone, or the like. The terminal apparatus 10 corresponds to an example of an information processing apparatus.

The server 12 is an apparatus configured so as to store information. The server 12 corresponds to an example of an external apparatus. The server 12 stores data such as image data, document data, and music data, for example. The data includes a data entity and attribute information indicating the attributes of the data. A data entity within image data is an image itself (for example, data having an image format similar to bitmap image data or the like), a data entity within document data is a document itself (for example, data having a text format similar to text data or the like), and a data entity within speech data is speech itself (for example, data having a speech format similar to mp3 data or the like). Attribute information is metadata that is attached to a data entity. Attribute information is information indicating, for example, the name of the data, a generation date/time of the data, an update date/time of the data, the size of the data (namely the data volume), the format of the data, or the like. The server 12 may be realized by a cloud service or the like.

Data is transmitted from the terminal apparatus 10 to the server 12, and the data is stored in the server 12, for example. Furthermore, data stored in the server 12 and attribute information or the like indicating the attributes of the data are transmitted from the server 12 to the terminal apparatus 10.

Figure 2:
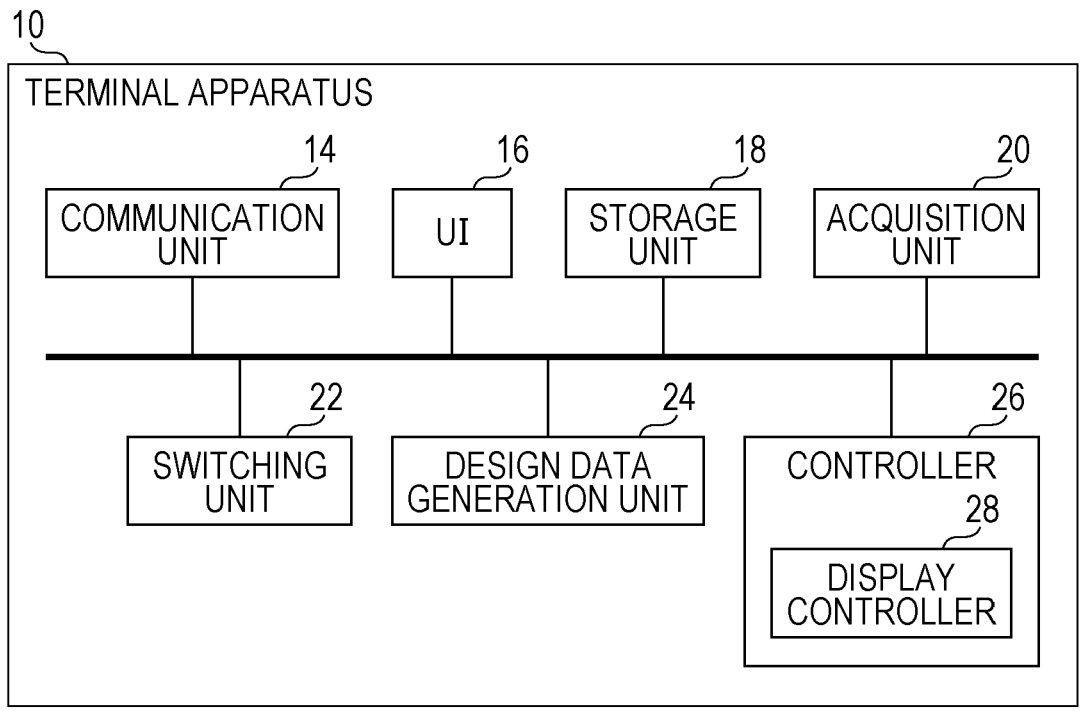
FIG. 2 is a block diagram depicting the configuration of a terminal apparatus according to the present exemplary embodiment.

The configuration of the terminal apparatus 10 will be described with reference to FIG. 2 hereinafter.

A communication unit 14 is a communication interface and has a function of transmitting information to other apparatuses and a function of receiving information transmitted from other apparatuses. The communication unit 14 may have a wireless communication function or may have a wired communication function.

A UI 16 is a user interface and includes a display unit and an operation unit. The display unit is a display apparatus such as a liquid crystal display or an EL display, for example. The operation unit is constituted by input apparatuses such as a keyboard and a mouse. A user interface provided with both a display unit and an operation unit (for example, a touch panel or the like) may be used as the UI 16.

A storage unit 18 is constituted by one or more storage areas where information is stored. The storage areas may be defined as one or more storage apparatuses (for example, physical drives such as hard disk drives or memories) provided in the terminal apparatus 10 or may be defined as logical partitions or logical drives that are set in one or more storage apparatuses.

An acquisition unit 20 is configured so as to acquire information from the server 12. The acquisition unit 20 acquires information from the server 12 via the communication unit 14, for example.

A switching unit 22 is configured so as to switch an information acquisition mode executed by the acquisition unit 20. The switching unit 22 sets the acquisition mode executed by the acquisition unit 20 by switching between a first acquisition mode and a second acquisition mode, for example. In the first acquisition mode, the acquisition unit 20 acquires attribute information indicating the attributes of data from the server 12. In the second acquisition mode, the acquisition unit 20 acquires information for displaying an image that indicates the features of data from the server 12. It should be noted that the first acquisition mode corresponds to an example of a "first mode" and the second acquisition mode corresponds to an example of a "second mode".

The acquisition unit 20 acquires information from the server 12 by executing the acquisition mode that has been set by the switching unit 22.

The switching unit 22 may switch between the first acquisition mode and the second acquisition mode for each item of data, or may switch between the first acquisition mode and the second acquisition mode in a batch manner for all data to be acquired.

The switching unit 22 may switch between the first acquisition mode and the second acquisition mode in accordance with a user instruction, or may switch between the first acquisition mode and the second acquisition mode in accordance with a predetermined switching condition. In these cases also, the switching unit 22 may switch the acquisition mode for each item of data, or may switch the acquisition mode in a batch manner for all data to be acquired.

The switching condition is the image quality of data, the volume of data, the type of data, or the like. For example, for each item of data, the switching unit 22 may switch between the first acquisition mode and the second acquisition mode in accordance with the resolution of the data, the volume of the data, or the type of the data. The type of data is determined by the data format. Image data, document data, speech data, or the like may be given as examples of the type of data. The switching unit 22 may switch between the first acquisition mode and the second acquisition mode in accordance with the volume of all data to be acquired.

The switching unit 22 may be configured so as to switch the display mode for information. The switching unit 22 sets a display mode executed by a display controller 28 described later, by switching between a first display mode and a second display mode, for example. In the first display mode, the attribute information of data is displayed. In the second display mode, an image indicating the features of data is displayed. It should be noted that the first display mode corresponds to an example of the "first mode" and the second display mode corresponds to an example of the "second mode".

The display controller 28 described later executes the display mode that has been set by the switching unit 22, and thereby causes the display unit of the UI 16 to display information.

The switching unit 22 may switch between the first display mode and the second display mode for each item of data, or may switch between the first display mode and the second display mode in a batch manner for all data to be displayed.

The switching unit 22 may switch between the first display mode and the second display mode in accordance with a user instruction, or may switch between the first display mode and the second display mode in accordance with the aforementioned switching condition. In these cases also, the switching unit 22 may switch the display mode for each item of data, or may switch the display mode in a batch manner for all data to be displayed. The switching unit 22 may switch between the first display mode and the second display mode in accordance with the volume of all data to be displayed.

An image indicating the features of data is, for example, an image that has been reduced, namely a thumbnail image. An image indicating the features of image data is a thumbnail image of the image data in question, for example. Information for displaying an image that indicates the features of data may be the data itself or may be the actual image data indicating the features of the data (namely the thumbnail image data itself). The information for displaying an image that indicates the features of data may include attribute information of the data. In a case where image data is data indicating a document, the information for displaying an image that indicates the features of the image data may be image data indicating the layout of the document. An image indicating the layout of a document shall be referred to as a "template image" hereinafter.

A design data generation unit 24 is configured so as to receive image data indicating a document, and generate design data including template image data indicating the layout of the document and configuration information indicating the configuration of the document. The configuration information includes, for example, coordinate information of each region making up the document, information indicating the type of information to be entered into each region, information indicating the name of each region, and the like. The design data may include attribute information of image data. Moreover, the design data generation unit 24 may be provided in the server 12, and the generation of design data may be executed by the server 12.

A controller 26 is configured so as to control the operation of each unit of the terminal apparatus 10. Furthermore, the controller 26 includes the display controller 28.

The display controller 28 is configured so as to cause the display unit of the UI 16 to display information. The display controller 28 causes the display unit to display information acquired from the server 12 by the acquisition unit 20, for example. Furthermore, in a case where a display mode has been set by the switching unit 22, the display controller 28 executes the display mode that has been set by the switching unit 22.

Figure 3:
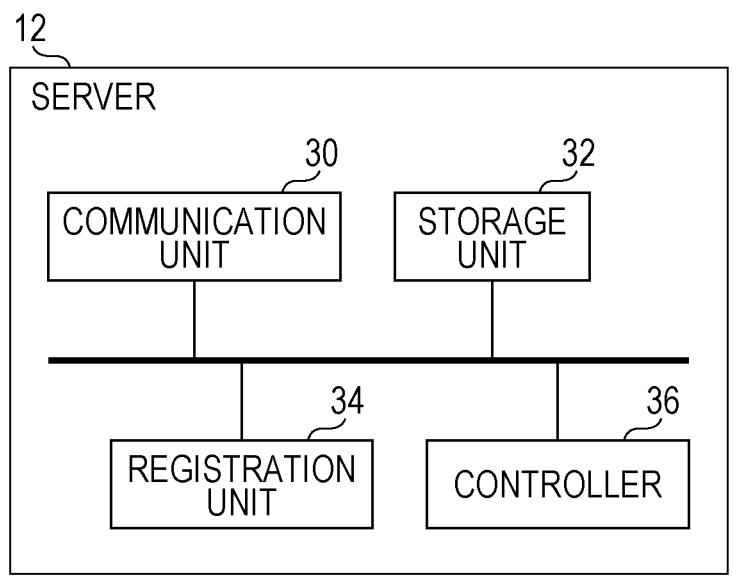
FIG. 3 is a block diagram depicting the configuration of a server according to the present exemplary embodiment.

The configuration of the server 12 will be described with reference to FIG. 3 hereinafter.

A communication unit 30 is a communication interface and has a function of transmitting information to other apparatuses and a function of receiving information transmitted from other apparatuses. The communication unit 30 may have a wireless communication function or may have a wired communication function.

A storage unit 32 is constituted by one or more storage areas where information is stored. The storage areas may be defined as one or more storage apparatuses (for example, physical drives such as hard disk drives or memories) provided in the terminal apparatus 10 or may be defined as logical partitions or logical drives that are set in one or more storage apparatuses.

A registration unit 34 is configured so as to cause the storage unit 32 to store data transmitted to the server 12 from an apparatus other than the server 12 (for example, the terminal apparatus 10 or another apparatus). For example, in a case where design data, image data, or the like has been transmitted from the terminal apparatus 10 to the server 12, the registration unit 34 causes the storage unit 32 to store the design data, image data, or the like.

A controller 36 is configured so as to control the operation of each unit of the server 12.

Processing carried out by the information processing system according to the present exemplary embodiment will be described in detail with specific examples hereinafter.

Hereinafter, it is assumed that image data indicating a document is to be stored in the storage unit 32 of the server 12, and the acquisition unit 20 is to acquire, from the server 12, attribute information indicating the attributes of the image data, or information for displaying a thumbnail image that indicates the features of the image data.

Here, as an example of image data indicating a document, it is assumed that image data indicating a form is to be stored in the storage unit 32. The form is, for example, a document that is assumed to have a name entry field, an address entry field, a contact details entry field, and the like, in which character strings or the like are entered into each entry field by a person filling out the form. It goes without saying that image data indicating a document other than a form may be stored in the storage unit 32.

In the present exemplary embodiment, first, design data for the form is stored in the storage unit 32 of the server 12, and (1) the form is thereby registered in the server 12. Next, (2) image data indicating a completed form is transmitted from the terminal apparatus 10 to the server 12 and stored in the storage unit 32 of the server 12. Next, (3) the terminal apparatus 10 acquires, from the server 12, attribute information indicating the attributes of the image data, or information for displaying an image that indicates the features of the image data. Each item of processing will be described in detail hereinafter.

(1) Processing to Register a Form in the Server 12

Processing to register a form in the server 12 will be described hereinafter. Design data for a form is stored in the storage unit 32 of the server 12, and the form is thereby registered in the server 12.

For example, a form having a name entry field, an address entry field, and the like is read by an image reading apparatus such as a scanner or a camera, and image data indicating the form is thereby generated. It goes without saying that image data indicating the form may be generated by another method. The image data indicating the form is input to the terminal apparatus 10.

The design data generation unit 24 receives the image data indicating the form, extracts, from the image data, template image data indicating the layout of the form and configuration information indicating the configuration of the form, and generates design data including the template image data and the configuration information. The template image data is image data indicating each entry field and the like making up the form. The form may be a form into which character strings or the like have not been entered or may be a form into which character strings or the like have been entered.

In a case where image data that has been input to the terminal apparatus 10 is image data indicating a form into which character strings or the like have not been entered, the template image data may be the image data itself that has been input. As another example, the design data generation unit 24 may extract regions having a frame-like shape as entry fields from the image data that has been input to the terminal apparatus 10, and generate image data indicating each entry field as template image data. In this case, the image data that has been input may be image data indicating a form into which character strings or the like have been entered. A publicly known technique is used as a technique for extracting entry fields, for example.

Figure 4:
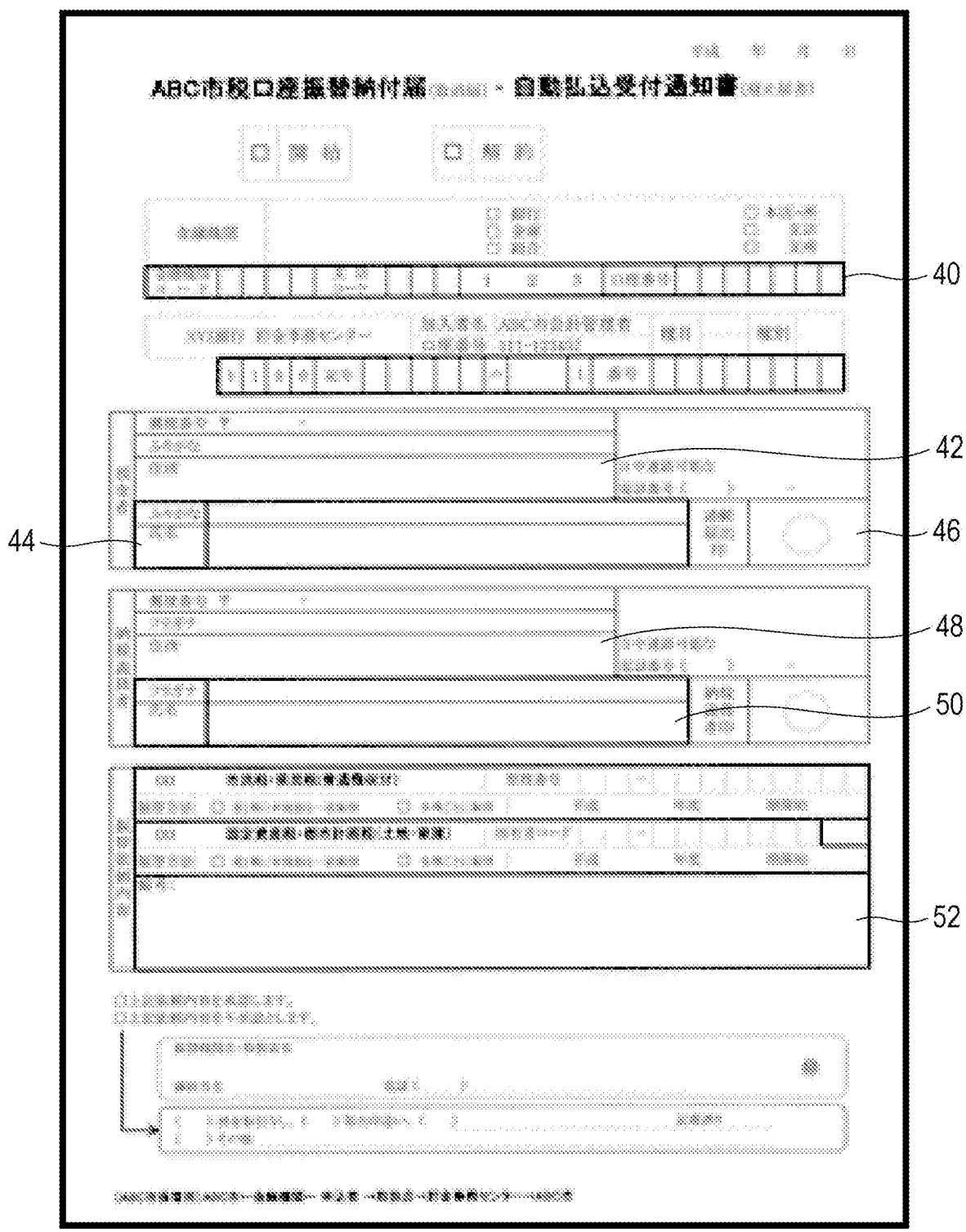
FIG. 4 is a drawing depicting an example of a template image.

FIG. 4 depicts an example of a template image. A template image 38 is, for example, actual image data indicating a form into which character strings or the like have not been entered. A name entry field, an address entry field, and the like are depicted in the template image 38.

The display controller 28 causes the display unit of the UI 16 to display the template image 38. The user, who is the registrant, designates each entry field indicated in the template image 38 and sets an input type for each entry field using the UI 16. The input type is the type of information to be entered into an entry field. The input type is, for example, a character string, a numerical value, a check mark, or the like. That is, a character string entry field into which a character string is to be entered, a numerical value entry field into which a numerical value is to be entered, a checkbox into which a check mark is to be entered, and the like are included in the form and depicted in the template image 38. The name entry field and the address entry field correspond to an example of a character string entry field into which a character string is to be entered, for example. The user designates the name entry field depicted in the template image 38 and sets character string as the input type using the UI 16, for example.

In the example depicted in FIG. 4, regions indicated by reference numbers 40, 42, 44, 46, 48, 50, and 52 are designated by the user as entry fields. For example, the region indicated by reference number 40 is an entry field into which the name of a financial institution is to be input, the region indicated by reference number 42 is an entry field into which an address is to be entered, the region indicated by reference number 44 is an entry field into which a name is to be entered, and the region indicated by reference number 46 is a seal impression field.

FIG. 5 depicts an example of a screen for setting the input type. This screen 54 is for setting the input type of the entry field indicated by reference number 40. For example, the entry field in question is a rectangular region, and the coordinates of each vertex of that rectangle are specified as coordinates of the entry field. For example, if the user designates the region indicated by reference number 40 on the template image 38 using the UI 16, the display controller 28 causes the display unit of the UI 16 to display the screen 54. The user then sets the input type on the screen 54. The design data generation unit 24 specifies the coordinates of the entry field in the template image 38. Information indicating those coordinates is displayed on the screen 54. Furthermore, a name or the like for the entry field may be input by the user. The input type is also set for the other entry fields.

It should be noted that an actual image indicating the form may be displayed instead of the template image 38 being displayed. In this case, the designation of entry fields and the setting of input types are carried out with respect to the image in question.

The design data generation unit 24 specifies the coordinates of each entry field in the template image 38, and generates configuration information including the coordinate information of each entry field and information indicating the input types set for each entry field. The design data generation unit 24 then generates design data including the template image data and the configuration information.

The user inputs a task name and a form name using the UI 16. The task name is the name of a task relating to the form. The form name is the name of the form. The design data generation unit 24 includes information indicating the task name and information indicating the form name in the design data as attribute information of the design data. For example, it is assumed that the task name is "AAA" and the form name is "BBB".

If the user instructs registration of the form to the server 12 using the UI 16, design data generated as described above is transmitted from the terminal apparatus 10 to the server 12. The registration unit 34 of the server 12 causes the storage unit 32 to store the design data. The design data is stored in the storage unit 32 in association with a task name and a form name. For example, each of one or more items of design data is stored in the storage unit 32 in association with a task name and a form name.

(2) Processing to Cause the Server 12 to Store Image Data Indicating a Completed Form Processing to cause the server 12 to store image data indicating a completed form will be described hereinafter. The person filling out the form enters numerical values, character strings, and the like into the entry fields included in a form. The completed form is read by an image reading apparatus such as a scanner or a camera, and image data indicating the completed form is thereby generated. The image data indicating the completed form is input to the terminal apparatus 10, for example. The user inputs the name of a task relating to the form and the name of the form using the UI 16. The controller 26 of the terminal apparatus 10 includes information indicating the task name and information indicating the form name in attribute information of the image data indicating the completed form. The image data indicating the completed form is transmitted from the terminal apparatus 10 to the server 12 and stored in the storage unit 32 of the server 12. The image data indicating the completed form is stored in the storage unit 32 in association with the task name and the form name. It should be noted that the image data indicating the completed form may be transmitted from the image reading apparatus to the server 12 without being transmitted from the terminal apparatus 10 to the server 12. In this case, the task name and the form name are input using the image reading apparatus or the terminal apparatus 10.

Figure 6:
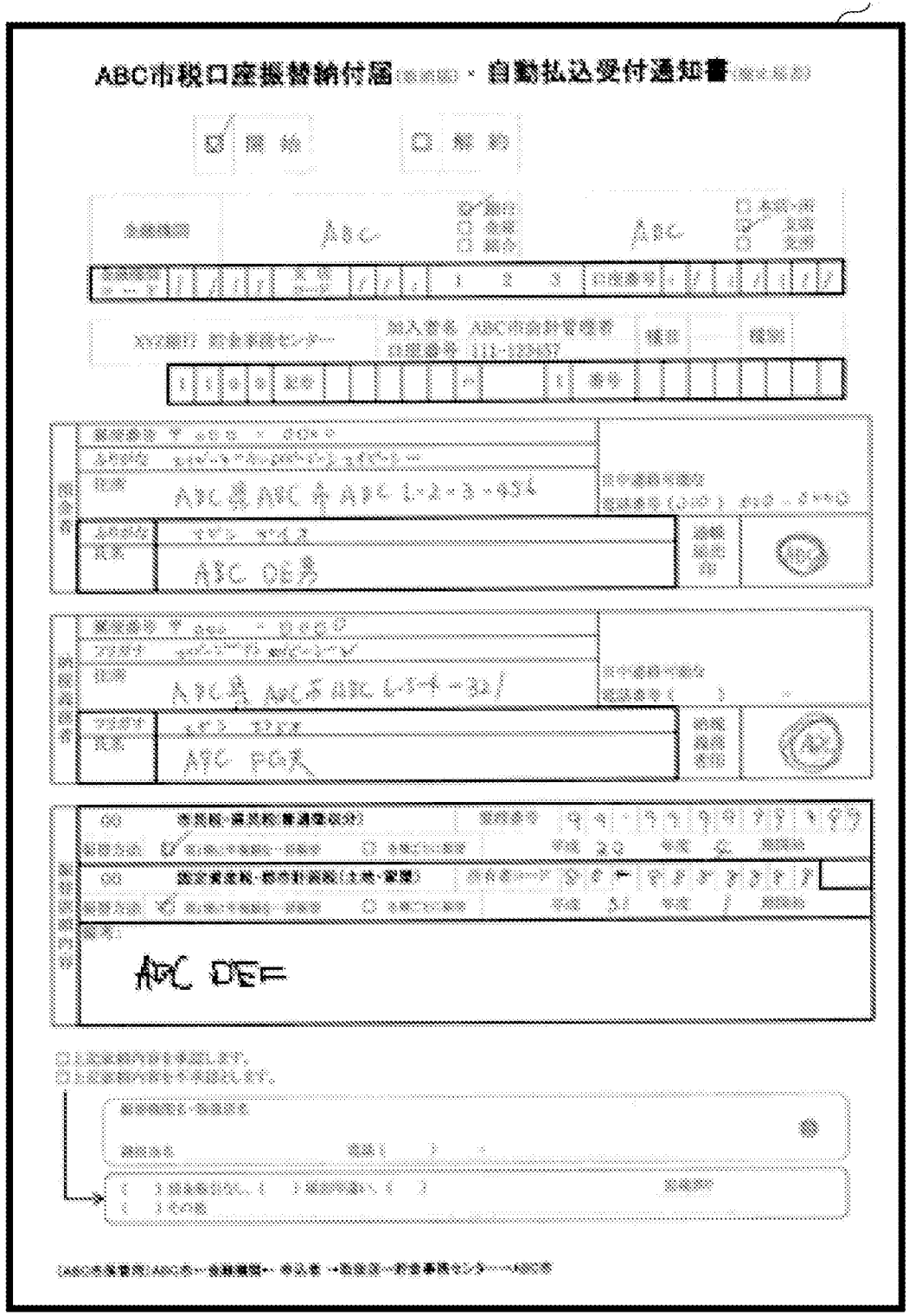
FIG. 6 is a drawing depicting an example of an image indicating a completed form.

FIG. 6 depicts an example of an image indicating a completed form. An image 56 is an example of an image indicating a completed form. In the image 56, entry fields are indicated in a manner similar to the template image 38 depicted in FIG. 4. Character strings and numerical values have been entered into the entry fields and seal impressions have been formed in the seal impression fields by the person filling out the form. Data of the image 56 is transmitted to the server 12 and stored in the storage unit 32.

Multiple items of image data indicating completed forms are transmitted to the server 12 and stored in the storage unit 32, for example. The attribute information of each item of image data includes information indicating a task name and information indicating a form name, and each item of image data is stored in the storage unit 32 in association with a task name and a form name. Furthermore, the attribute information of each item of image data may include information indicating the date/time at which reading has been carried out by the image reading apparatus.

As described above, design data is stored in the storage unit 32 in association with a task name and a form name, and each item of image data indicating a completed form is stored in the storage unit 32 in association with a task name and a form name. Consequently, design data and one or more items of image data associated with the same task name and the same form name are associated with each other. As a result, when a task name is designated, a search is performed for design data and image data associated with the task name. Similarly, when a form name is designated, a search is performed for design data and image data associated with the form name. When both a task name and a form name are designated, a search is performed for design data and image data associated with the task name and the form name.

Furthermore, character recognition processing such as OCR (optical character recognition) processing is executed on image data indicating a completed form, and thus characters are recognized from the image data and character information is extracted from the image data. The character recognition processing may be executed by the terminal apparatus 10, may be executed by the image reading apparatus, or may be executed by the server 12. For example, dictionary data for character recognition is stored in the apparatus, the cloud, or the like where character recognition processing is executed, and characters are recognized by using that dictionary data. Character information is extracted from each entry field by character recognition processing being executed on the image 56, for example. Coordinate information of the entry field and character information extracted from the entry field are associated for each entry field, and character recognition result information including these items of information is stored in the storage unit 32 in association with data of the image 56. The same is also true for other image data.

(3) Processing to Acquire Information from the Server 12

Processing to acquire information from the server 12 will be described hereinafter. For example, if the user, who is a worker, instructs acquisition of information from the server 12 using the UI 16, the acquisition unit 20 acquires information from the server 12 by executing the first acquisition mode or the second acquisition mode. The switching unit 22 sets the acquisition mode to the first acquisition mode or the second acquisition mode in accordance with a user instruction or a predetermined switching condition. The acquisition unit 20 executes the acquisition mode set by the switching unit 22. The first acquisition mode and the second acquisition mode will be described in detail hereinafter.

(3-1) First Acquisition Mode

The first acquisition mode will be described hereinafter. The acquisition unit 20 executes the first acquisition mode to thereby acquire the attribute information of image data indicating a completed form from the server 12. The display controller 28 causes the display unit of the UI 16 to display the attribute information acquired by the acquisition unit 20. The attribute information includes information indicating, for example, the name, update date/time, size, data format, and the like of the image data.

The acquisition unit 20 may acquire, from the server 12, the attribute information of all image data stored in the server 12. In a case where the user has used the UI 16 to designate a task name to be acquired, the acquisition unit 20 acquires, from the server 12, the attribute information of the image data associated with the task name designated by the user. In a case where the user has used the UI 16 to designate a form name to be acquired, the acquisition unit 20 acquires, from the server 12, the attribute information of the image data associated with the form name designated by the user. In a case where the user has used the UI 16 to designate a task name and a form name to be acquired, the acquisition unit 20 acquires, from the server 12, the attribute information of the image data associated with the task name and form name designated by the worker. Furthermore, in a case where the user has designated a specific storage area (for example, a folder or the like) in the storage unit 32 using the UI 16, the acquisition unit 20 acquires, from the server 12, the attribute information of the image data stored in the specific storage area.

FIG. 7 depicts an example of a screen displayed in the first acquisition mode. A screen 58 is displayed on the display unit of the UI 16. A list of the attribute information acquired by the acquisition unit 20 is displayed on the screen 58. Here, the task name "AAA" and the form name "BBB" are designated by the user, and the attribute information of the image data associated with the task name "AAA" and the form name "BBB" are acquired and displayed on the screen 58. The attribute information is composed of character strings that express the attributes of the image data. As an example, the screen 58 displays information indicating the name, update date/time, size, data format, and the like of each item of image data.

It should be noted that the display mode in which the attribute information of the image data is displayed is the first display mode. In a case where attribute information is acquired with the first acquisition mode being executed by the acquisition unit 20, the display controller 28 executes the first display mode, and thereby causes the display unit of the UI 16 to display the attribute information.

(3-2) Second Acquisition Mode

The second acquisition mode will be described hereinafter. The acquisition unit 20 executes the second acquisition mode to thereby acquire information for displaying an image that indicates the features of image data indicating a completed form from the server 12. The display controller 28 causes the display unit of the UI 16 to display the image that indicates the features of image data indicating a completed form. The image that indicates the features of image data indicating a completed form is, for example, a thumbnail image of a template image indicating the layout of a form. In this case, the information for displaying the image that indicates the features of image data indicating a completed form is template image data indicating the layout of a form. It should be noted that, as described later, these are merely examples. Other instances will be explained in the examples described hereinafter. The display controller 28 generates thumbnail image data for template image data, and causes the display unit of the UI 16 to display a thumbnail image that is based on the thumbnail image data. In the present exemplary embodiment, as described hereinafter, any of examples 1 to 6 is executed for the second acquisition mode. Each example will be described in detail hereinafter.

(3-2-1) Example 1 of the Second Acquisition Mode

Figure 8:
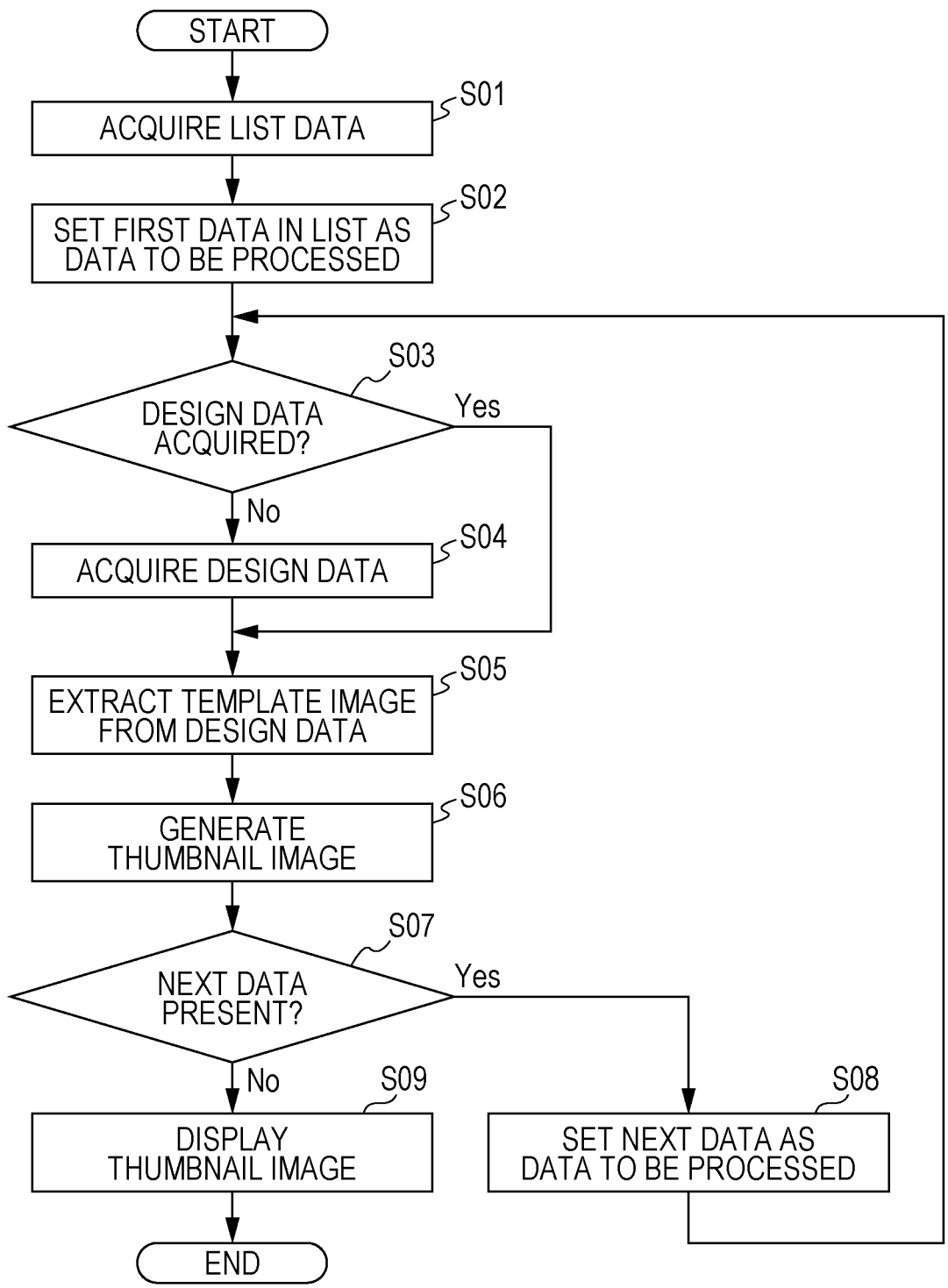
FIG. 8 is a drawing depicting a flowchart indicating processing according to example 1 of a second acquisition mode.

Example 1 of the second acquisition mode will be described in detail with reference to FIG. 8 hereinafter. FIG. 8 depicts a flowchart indicating processing according to example 1.

First, the acquisition unit 20 acquires list data from the server 12 (S01). The list data is data indicating a list of image data stored in the server 12, and data indicating a list of image data indicating completed forms. The list data includes information indicating the name of each item of image data, information indicating the task name associated with each item of image data, and information indicating the form name associated with each item of image data. It should be noted that the information indicating the task name and the information indicating the form name may be included in the information indicating the name of the image data. Furthermore, information indicating the date/time at which a completed form has been read, in other words, information indicating a scan date/time, may be included in the information indicating the name of the image data.

In a case where the user has designated a task name and a form name using the UI 16, the acquisition unit 20 acquires, from the server 12, list data indicating a list of image data associated with the designated task name and form name. Furthermore, in a case where the user has designated a specific storage area (for example, a folder or the like) in the storage unit 32 using the UI 16, the acquisition unit 20 acquires list data indicating a list of image data stored in the specific storage area. The display controller 28 may cause the display unit of the UI 16 to display a list. A list of names of image data is thereby displayed on the display unit.

Next, the acquisition unit 20 sets the first image data in the list as data to be processed (S02). It should be noted that the order in which the items of image data are arranged in the list may be determined in advance and may be changed by the user. For example, the order in which the items of image data are arranged is determined on the basis of the name of the image data, the volume of the image data, the creation date/time, or the like. It is assumed that the name of the first image data is "taskAAA-formBBB_0004", for example.

Next, the acquisition unit 20 confirms whether or not design data relating to the image data to be processed has been acquired (S03). The processing of step S03 will be described in detail. The aforementioned list data includes information indicating a task name and information indicating a form name for each item of image data. Furthermore, the design data includes information indicating a task name and information indicating a form name. In this way, the image data and the design data are each associated with a task name and a form name. The acquisition unit 20 confirms whether or not design data having associated therewith the same task name and form name as the task name and form name associated with the image data to be processed has already been acquired from the server 12 by the acquisition unit 20.

In a case where design data having associated therewith the same task name and form name as the task name and form name associated with the image data to be processed has already been acquired (S03: yes), processing transitions to step S05.

In a case where design data having associated therewith the same task name and form name as the task name and form name associated with the image data to be processed has not been acquired (S03: no), the acquisition unit 20 acquires, from the server 12, design data associated with the task name and the form name in question (S04). That is, the acquisition unit 20 acquires, from the server 12, design data that includes information indicating the task name and information indicating the form name in question.

For example, in a case where the task name associated with the image data to be processed is "AAA" and the form name is "BBB", if design data associated with the task name "AAA" and the form name "BBB" has not been acquired, the acquisition unit 20 acquires the design data from the server 12.

Next, the display controller 28 extracts template image data from the design data acquired by the acquisition unit 20 (S05). Here, template image data associated with the task name "AAA" and the form name "BBB" is extracted.

Next, the display controller 28 generates thumbnail image data for the template image data as thumbnail image data of the image data to be processed (S06). For example, thumbnail image data for the template image data associated with the task name "AAA" and the form name "BBB" is generated as thumbnail image data of the image data to be processed. The thumbnail image data for the template image data is used as thumbnail image data for the image data having the name "taskAAA-formBBB_0004".

The template image data corresponds to an example of information for displaying an image that indicates the features of image data indicating a completed form. The thumbnail image data for template image data corresponds to an example of image data that indicates the features of image data indicating a completed form.

In a case where there is subsequent image data in the list (S07: yes), the acquisition unit 20 sets the subsequent image data as data to be processed (S08). Processing then returns to step S03, and the processing of steps S03 to S06 is executed on the subsequent image data.

It is assumed that the name of the subsequent image data is "taskAAA-formBBB_0005", for example. In a case where the task name associated with the subsequent image data is "AAA" and the form name is "BBB", since the design data associated with the task name "AAA" and the form name "BBB" has already been acquired by the acquisition unit 20 (S03: yes), the acquisition unit 20 does not acquire the design data again from the server 12. In this case, the display controller 28 extracts template image data from the design data that has already been acquired (S05), and generates thumbnail image data for the template image data as thumbnail image data for the subsequent image data (S06). The thumbnail image data for the template image data is used as thumbnail image data for the image data having the name "taskAAA-formBBB_0005". That is, the same design data is used and the thumbnail image data for the same template image data is used for the image data having the name "taskAAA-formBBB_0004" and the image data having the name "taskAAA-formBBB_0005". In other words, in a case where multiple items of image data indicating completed forms and associated with the same task name and the same form name are included in the list, one item of the design data associated with the task name and form name in question is acquired once by the acquisition unit 20. Then, thumbnail image data for each of the multiple items of image data is generated by the template image data included in the design data being used a number of times. Even in a case where the information that has been entered is different, the same thumbnail image data is used for the image data having the name "taskAAA-formBBB_0004" and the image data having the name "taskAAA-formBBB_0005".

In a case where there is no subsequent image data in the list (S07: no), the display controller 28 causes the display unit of the UI 16 to display thumbnail images that are based on the generated thumbnail image data (S09). At such time, the display controller 28 causes the display unit to display the thumbnail images with the names of the image data indicating completed forms being associated with the thumbnail images. The display mode in which the thumbnail images are displayed corresponds to an example of the second display mode.

Figure 9:
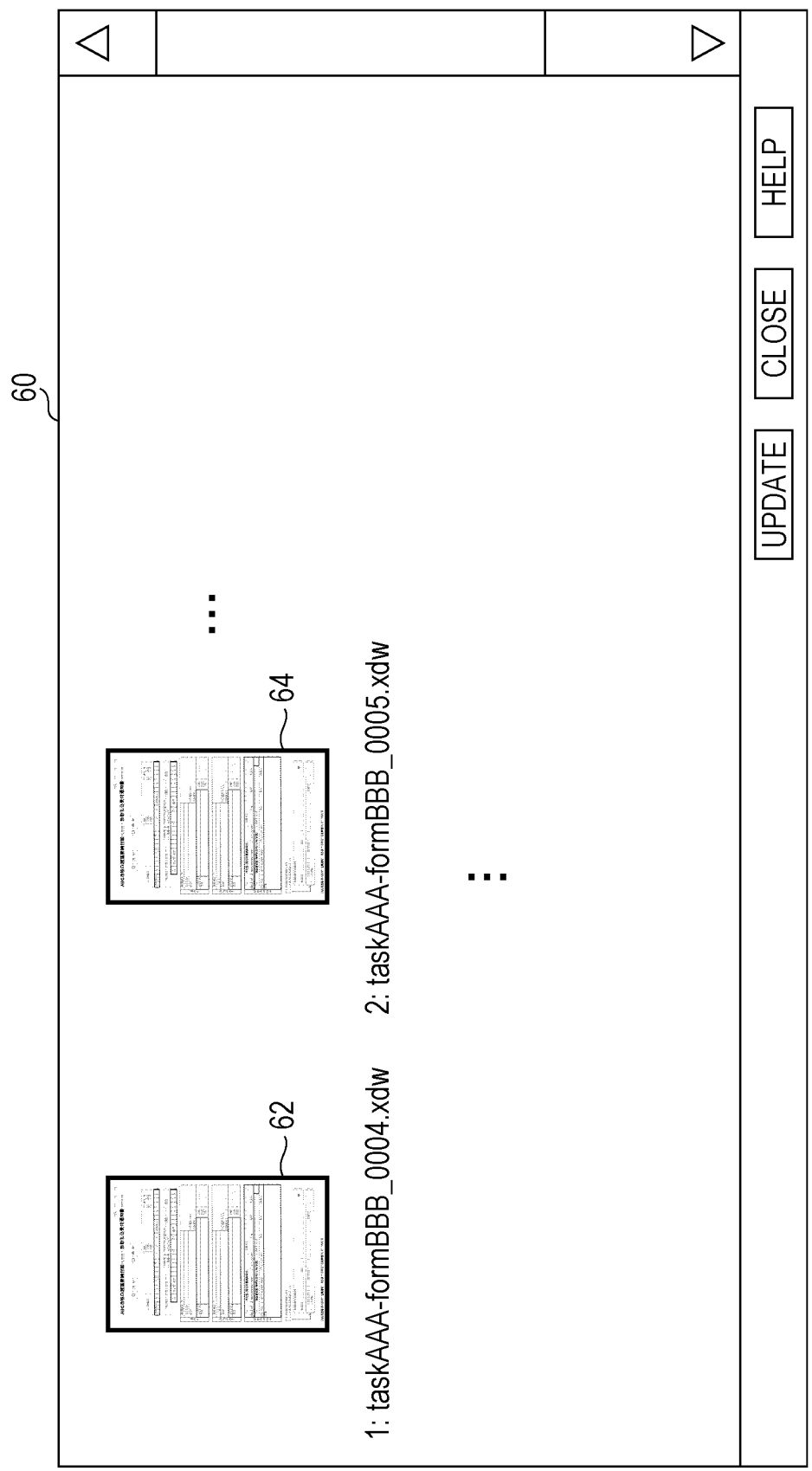
FIG. 9 is a drawing depicting an example of a screen.

FIG. 9 depicts an example of a screen displayed in example 1 of the second acquisition mode. A screen 60 is displayed on the display unit of the UI 16. The screen 60 displays thumbnail images 62, 64, and the like which have been generated as described above. The thumbnail images 62 and 64 are images based on thumbnail image data that has been generated based on template image data included in design data associated with the task name "AAA" and the form name "BBB". The thumbnail image 62 is displayed as a thumbnail image for the image data having the name "taskAAA-formBBB_0004". The thumbnail image 64 is displayed as a thumbnail image for the image data having the name "taskAAA-formBBB_0005". The thumbnail images 62 and 64 are the same images based on the same template image data. Even in a case where the information that has been entered is different, thumbnail images based on thumbnail image data generated from the same template image data are displayed as the thumbnail images 62 and 64 for the image data having the name "taskAAA-formBBB_0004" and the image data having the name "taskAAA-formBBB_0005". Furthermore, the names of the image data are associated with each of the thumbnail images 62 and 64. For example, a character string indicating "taskAAA-formBBB_0004" is displayed in association with the thumbnail image 62. The same is true also for the thumbnail image 64.

In a case where multiple items of image data indicating completed forms and for which the same task name and the same form name are associated are included in the list, thumbnail image data for each of the multiple items of image data is generated by one item of design data being acquired once and the template image data included in the design data being used a number of times. By doing so, the communication data amount decreases compared to a case where thumbnail image data is generated with all image data indicating completed forms being acquired from the server 12. That is, the communication load decreases.

For example, even in a case where 100 items of image data are included in the list, if the 100 items of image data are associated with the same task name and the same form name, one item of design data is acquired from the server 12. Then, thumbnail image data for each of the 100 items of image data is generated on the basis of the template image data included in the design data. By doing so, the communication data amount decreases compared to a case where all 100 items of image data are acquired from the server 12.

A thumbnail image of a template image indicates the layout of a form. For that reason, it becomes easy for the user to comprehend the content of image data compared to a case where only attribute information composed of character strings is displayed.

In the aforementioned example, the acquisition unit 20 acquires design data including template image data from the server 12, and the display controller 28 generates thumbnail image data on the basis of the template image data. As another example, the acquisition unit 20 may acquire thumbnail image data from the server 12. In this case, thumbnail image data is generated in the server 12 on the basis of template image data.

(3-2-2) Example 2 of the Second Acquisition Mode

Figure 10:
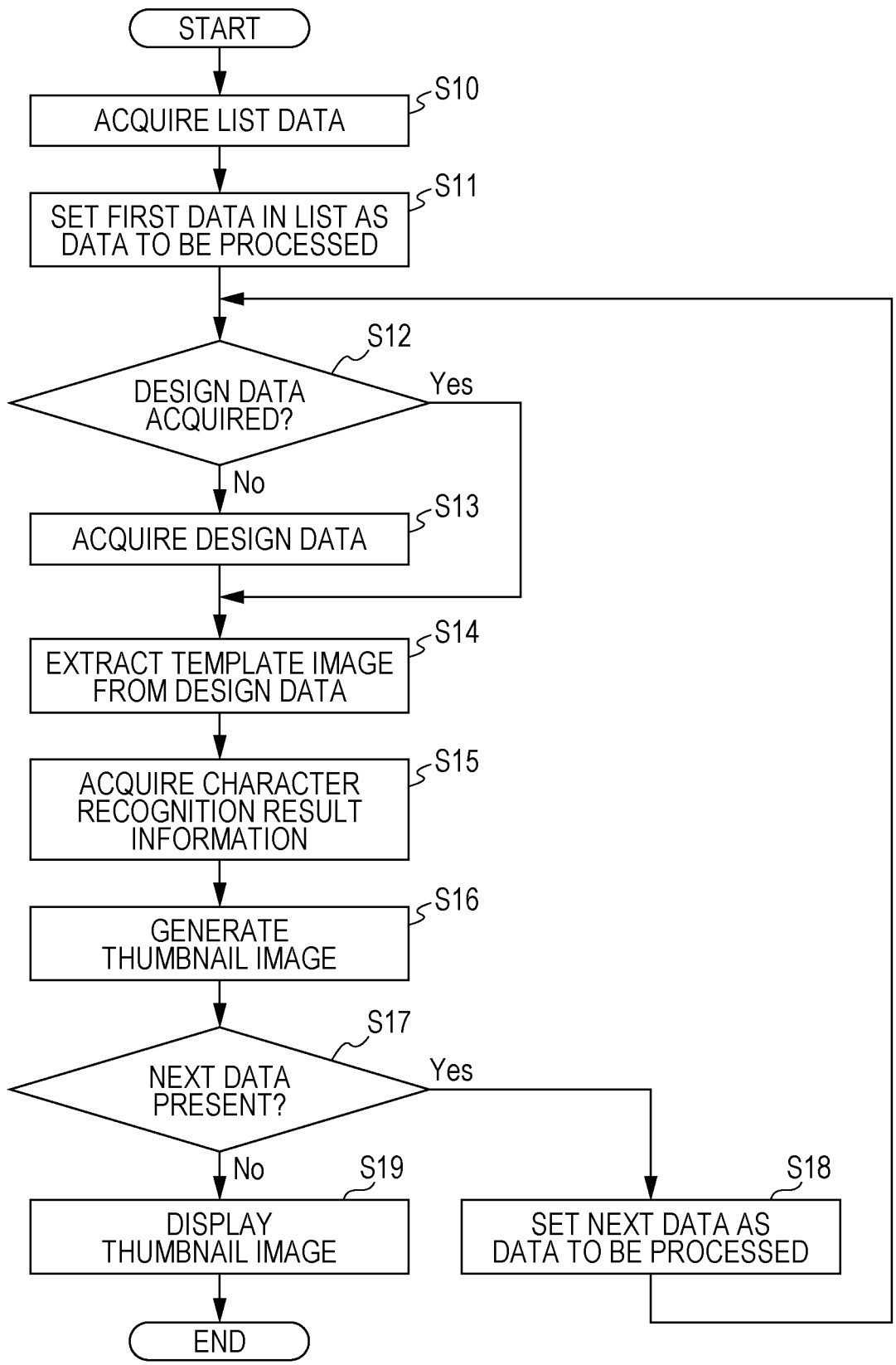
FIG. 10 is a drawing depicting a flowchart indicating processing according to example 2 of the second acquisition mode.

Example 2 of the second acquisition mode will be described in detail with reference to FIG. 10 hereinafter. FIG. 10 depicts a flowchart indicating processing according to example 2.

The processing of steps S10 to S14 in FIG. 10 is the same as the processing of steps S01 to S05 in FIG. 8, and therefore a description thereof will be omitted and the processing of step S15 and thereafter will be described.

The acquisition unit 20 acquires, from the server 12, character recognition result information associated with image data to be processed (S15). As described above, character recognition processing is executed on image data indicating a completed form, and, as a result, coordinate information of the entry field and character information extracted from the entry field are associated for each entry field, and character recognition result information including these items of information is stored in the storage unit 32 in association with the image data in question. The acquisition unit 20 acquires the character recognition result information. For example, in a case where the image data to be processed is image data having the name "taskAAA-formBBB_0004", the acquisition unit 20 acquires character recognition result information associated with the image data from the server 12.

Next, the display controller 28 combines the character information included in the character recognition result information with the template image data extracted in step S14, on the basis of the coordinate information included in the character recognition result information acquired in step S15, and generates thumbnail image data for the template image data combined with the character information, as thumbnail image data of the image data to be processed (S16). That is, the display controller 28 enters character information into the template image data, and generates thumbnail image data for the template image data into which the character information has been entered.

The template image data and the character recognition result information correspond to an example of information for displaying an image that indicates the features of image data indicating a completed form. That is, character strings extracted from image data indicating a completed form are included in information for displaying an image that indicates the features of the image data indicating the completed form. Thumbnail image data for template image data combined with character information corresponds to an example of image data that indicates the features of image data indicating a completed form.

In a case where there is subsequent image data in the list (S17: yes), the acquisition unit 20 sets the subsequent image data as image data to be processed (S18). Processing then returns to step S12, and the processing of steps S12 to S16 is executed on the subsequent image data.

It is assumed that the name of the subsequent image data is "taskAAA-formBBB_0005", for example. In this case, similar to the aforementioned example 1, the acquisition unit 20 does not acquire design data again from the server 12. However, the acquisition unit 20 acquires, from the server 12, character recognition result information associated with the subsequent image data. The display controller 28 then combines the character information included in the character recognition result information with the template image data that has already been acquired, and generates thumbnail image data for the template image data combined with the character information, as thumbnail image data for the subsequent image data. Thus, the same template image data is used for the image data having the name "taskAAA-formBBB_0004" and the image data having the name "taskAAA-formBBB_0005"; however, because the character recognition result information associated with each item of image data is different from each other, thumbnail image data is generated having character information that is different from each other.

In a case where there is no subsequent image data in the list (S17: no), the display controller 28 causes the display unit of the UI 16 to display thumbnail images that are based on the generated thumbnail image data (S19). At such time, the display controller 28 causes the display unit to display the thumbnail images with the names of the image data indicating completed forms being associated with the thumbnail images. The display mode in which the thumbnail images are displayed corresponds to an example of the second display mode.

Figure 11:
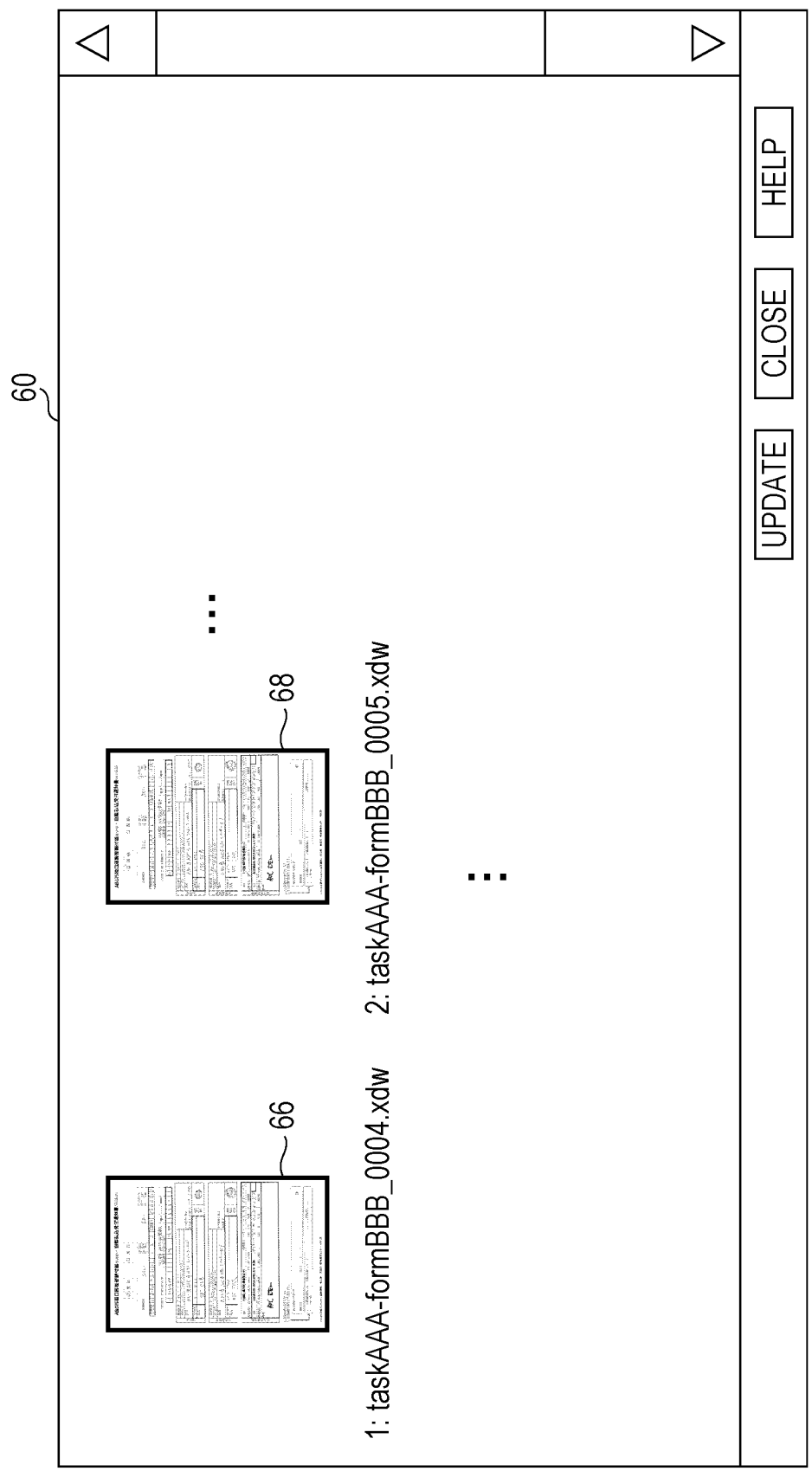
FIG. 11 is a drawing depicting an example of a screen.

FIG. 11 depicts an example of a screen displayed in example 2 of the second acquisition mode. The screen 60 is displayed on the display unit of the UI 16. The screen 60 displays thumbnail images 66, 68, and the like which have been generated as described above. The thumbnail image 66 is displayed as a thumbnail image for the image data having the name "taskAAA-formBBB_0004". The thumbnail image 68 is displayed as a thumbnail image for the image data having the name "taskAAA-formBBB_0005". The thumbnail image 66 is a thumbnail image that is generated based on template image data included in design data associated with the task name "AAA" and the form name "BBB", and character information extracted from image data having the name "taskAAA-formBBB_0004". The thumbnail image 68 is a thumbnail image that is generated based on template image data included in design data associated with the task name "AAA" and the form name "BBB", and character information extracted from image data having the name "taskAAA-formBBB_0005". The same template image data is used for the thumbnail images 66 and 68, and therefore the layout of the form indicated in the thumbnail image 66 and the layout of the form indicated in the thumbnail image 68 are the same. The information that has been entered is different for the image data having the name "taskAAA-formBBB_0004" and the image data having the name "taskAAA-formBBB_0005", and therefore the character information indicated in each of the thumbnail images 66 and 68 is different from each other. Furthermore, the names of the image data are associated with each of the thumbnail images 66 and 68.

Since thumbnail image data is generated based on template image data and character information, thumbnail images incorporating character recognition results are displayed.

The data volume is generally less for character information than for image data, and therefore, by displaying thumbnail images with character information being acquired and image data indicating completed forms not being acquired, the communication data amount decreases compared to the case where image data indicating completed forms is acquired. In addition, thumbnail images incorporating character recognition results are displayed.

For example, in a case where 100 items of image data are included in the list, if the 100 items of image data are associated with the same task name and the same form name, one item of design data and 100 items of character recognition result information are acquired from the server 12. By doing so, the communication data amount decreases compared to a case where all 100 items of image data are acquired from the server 12. Furthermore, thumbnail images incorporating character recognition results for each of the 100 items of image data are displayed.

(3-2-3) Example 3 of the Second Acquisition Mode

Figure 12:
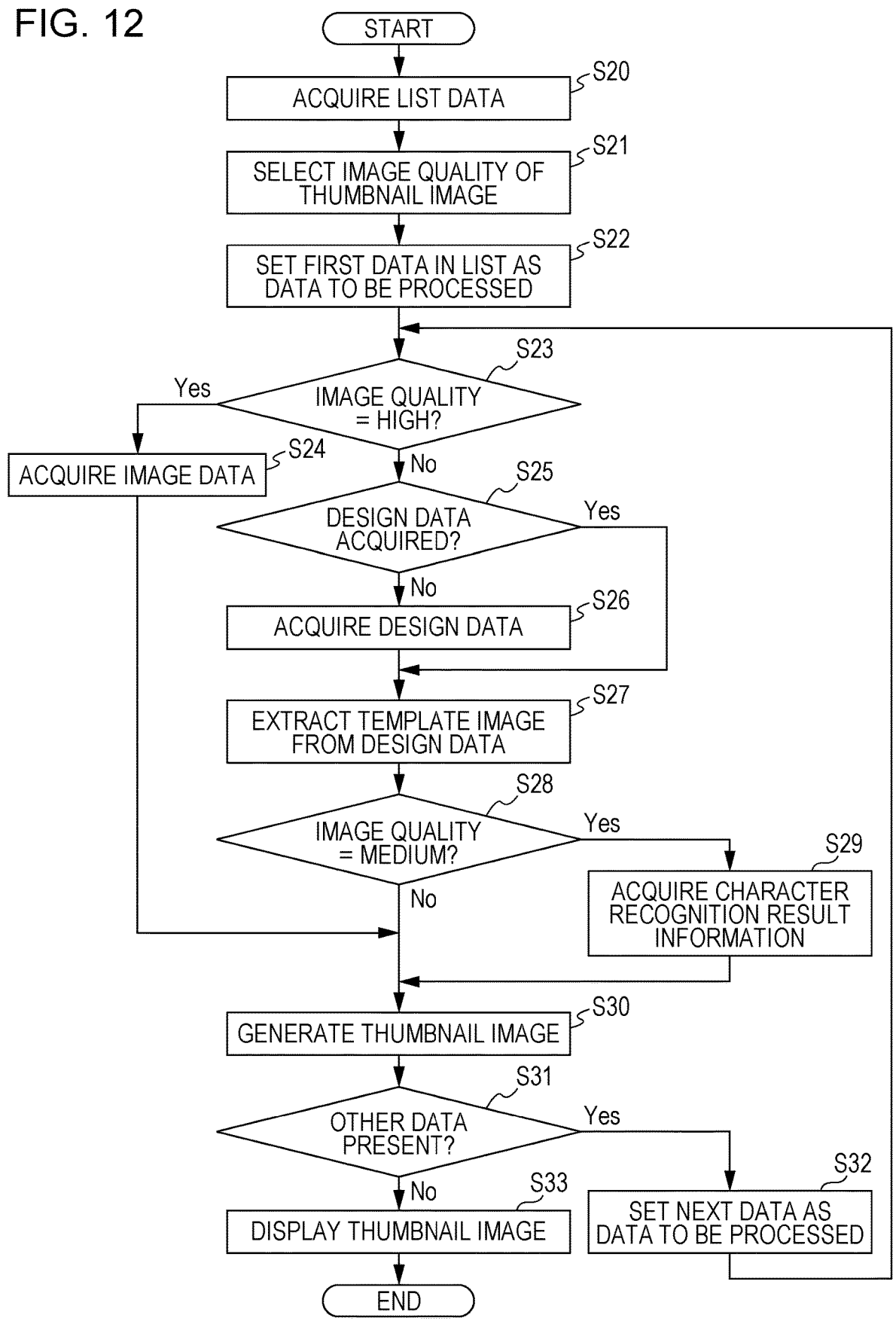
FIG. 12 is a drawing depicting a flowchart indicating processing according to example 3 of the second acquisition mode.

Example 3 of the second acquisition mode will be described in detail with reference to FIG. 12 hereinafter. FIG. 12 depicts a flowchart indicating processing according to example 3.

First, similar to step S01 in FIG. 8, the acquisition unit 20 acquires list data from the server 12 (S20).

Next, the user selects the image quality for a thumbnail image using the UI 16 (S21). For example, the display controller 28 causes the display unit of the UI 16 to display a screen for selecting the image quality. The user selects the image quality on the screen. Here, as an example, the image quality is divided into three levels such as high, medium, and low. It goes without saying that the image quality may be determined by another setting method. Furthermore, in some cases the data volume changes depending on the image quality and the communication fee consequently changes, and therefore the communication fee required to display thumbnail images of each image quality may be displayed. Furthermore, the data volume for each image quality may be displayed. The user may select the image quality with reference to these items of information.

Next, the acquisition unit 20 sets the first image data in the list as data to be processed (S22).

In a case where a high image quality has been selected by the user (S23: yes), the acquisition unit 20 acquires, from the server 12, the image data to be processed (S24). Next, the display controller 28 generates thumbnail image data for the image data acquired by the acquisition unit 20 (S30).

The image data to be processed corresponds to an example of information for displaying an image that indicates the features of image data indicating a completed form. The thumbnail image data of the image data to be processed corresponds to an example of image data that indicates the features of image data indicating a completed form. In this way, the image data to be processed may itself be used as information for displaying an image that indicates features.

In a case where a high image quality has not been selected by the user (S23: no), similar to step S03 in FIG. 8, the acquisition unit 20 confirms whether or not design data relating to the image data to be processed has been acquired (S25).

In a case where design data having associated therewith the same task name and form name as the task name and form name associated with the image data to be processed has been acquired (S25: yes), processing transitions to step S27.

In a case where design data having associated therewith the same task name and form name as the task name and form name associated with the image data to be processed has not been acquired (S25: no), similar to step S04 in FIG. 8, the acquisition unit 20 acquires, from the server 12, design data associated with the task name and the form name in question (S26). That is, the acquisition unit 20 acquires, from the server 12, design data that includes information indicating the task name and information indicating the form name in question.

Next, the display controller 28 extracts template image data from the design data acquired by the acquisition unit 20 (S27).

Next, in a case where a medium image quality has been selected by the user (S28: yes), similar to step S15 in FIG. 10, the acquisition unit 20 acquires, from the server 12, character recognition result information associated with the image data to be processed (S29). Next, similar to step S16 in FIG. 10, the display controller 28 combines the character information included in the character recognition result information acquired in step S29 with the template image data extracted in step S27, and generates thumbnail image data for the template image data combined with the character information, as thumbnail image data of the image data to be processed (S30).

In a case where a medium image quality has not been selected by the user (S28: no), that is, in a case where a low image quality has been selected by the user, similar to step S06 in FIG. 8, the display controller 28 generates thumbnail image data for the template image data extracted in step S27 (S30).

In a case where there is subsequent image data in the list (S31: yes), the acquisition unit 20 sets the subsequent image data as image data to be processed (S32). Processing then returns to step S23, and the processing of steps S23 to S30 is executed on the subsequent image data.

In a case where there is no subsequent image data in the list (S31: no), the display controller 28 causes the display unit of the UI 16 to display thumbnail images that are based on the generated thumbnail image data (S33). At such time, the display controller 28 causes the display unit to display the thumbnail images with the names of the image data indicating completed forms being associated with the thumbnail images. The display mode in which the thumbnail images are displayed corresponds to an example of the second display mode.

(3-2-4) Example 4 of the Second Acquisition Mode

Figure 13:
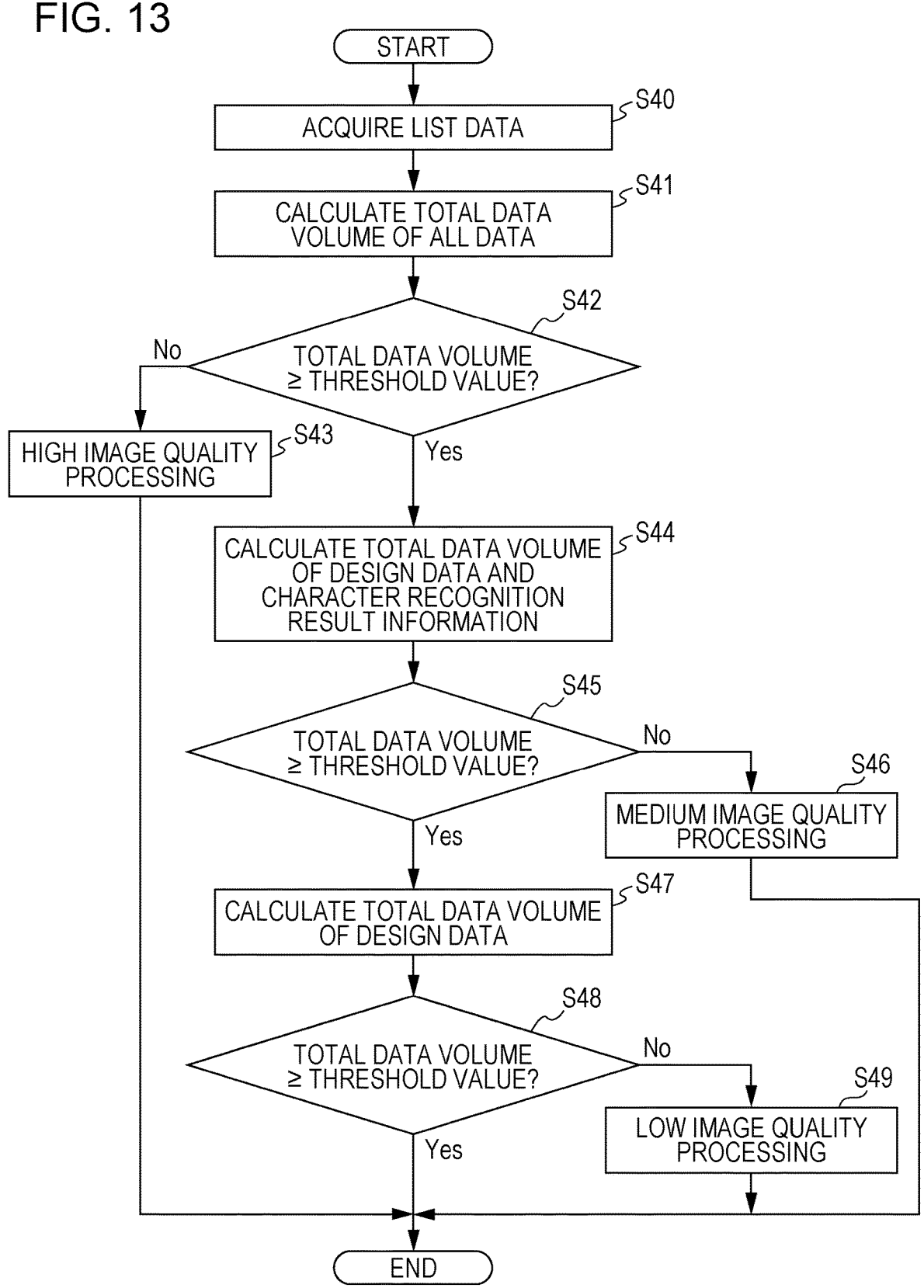
FIG. 13 is a drawing depicting a flowchart indicating processing according to example 4 of the second acquisition mode.

Example 4 of the second acquisition mode will be described in detail with reference to FIG. 13 hereinafter. FIG. 13 depicts a flowchart indicating processing according to example 4.

First, similar to step S01 in FIG. 8, the acquisition unit 20 acquires list data from the server 12 (S40).

Next, the acquisition unit 20 calculates the total data volume of all image data included in the list (S41). For example, the acquisition unit 20 acquires, from the server 12, information indicating the data volume of each item of image data included in the list, and calculates the total data volume of all image data. It should be noted that the information indicating the data volume is included in the attribute information of the image data and stored in the storage unit 32 of the server 12.

In a case where the total data volume of all image data is not greater than or equal to a predetermined threshold value (S42: no), that is, in a case where the total data volume is less than the threshold value, the acquisition unit 20 executes high image quality processing (S43). The high image quality processing is the processing of step S24 in FIG. 12, and the processing of step S30 and thereafter. Due to the high image quality processing being executed, all image data included in the list is acquired from the server 12, thumbnail image data for the acquired image data is generated, and thumbnail images based on the thumbnail image data are displayed. It should be noted that the threshold value may be changed by the user or the like.

In a case where the total data volume of all image data is greater than or equal to the threshold value (S42: yes), the acquisition unit 20 calculates the total data volume of design data and character recognition result information for all image data included in the list (S44). For example, the acquisition unit 20 acquires, from the server 12, information indicating the data volume of each item of design data associated with each item of image data included in the list, and information indicating the data volume of character recognition result information associated with each item of image data included in the list, and calculates the total data volume of these items of data.

In a case where the total data volume of the design data and character recognition result information for all image data is not greater than or equal to the threshold value (S45: no), that is, in a case where the total data volume is less than the threshold value, the acquisition unit 20 executes medium image quality processing (S46). The medium image quality processing is the processing of steps S25, S26, S27, and S29 in FIG. 12, and the processing of step S30 and thereafter. Due to the medium image quality processing being executed, design data relating to the image data included in the list and character recognition result information for all image data included in the list are acquired from the server 12, thumbnail image data for the template image data combined with character information is generated, and thumbnail images based on the thumbnail image data are generated.

In a case where the total data volume of design data and character recognition result information for all image data is greater than or equal to the threshold value (S45: yes), the acquisition unit 20 calculates the total data volume of the design data associated with each item of image data included in the list (S47).

In a case where the total data volume of the design data is not greater than or equal to the threshold value (S48: no), that is, in a case where the total data volume is less than the threshold value, the acquisition unit 20 executes low image quality processing. The low image quality processing is the processing of steps S25, S26, and S27 in FIG. 12, and the processing of step S30 and thereafter. Due to the low image quality processing being executed, design data relating to the image data included in the list is acquired from the server 12, thumbnail image data for template image data is generated, and thumbnail images based on the thumbnail image data are displayed.

In a case where the total data volume of the design data is greater than or equal to the threshold value (S48: yes), thumbnail images are not displayed. In this case, the acquisition unit 20 may acquire the attribute information of each item of image data included in the list from the server 12, and the display controller 28 may display the attribute information of each item of image data on the display unit of the UI 16 as depicted in FIG. 7.

In the aforementioned example, processing is switched according to the data volume of all image data; however, processing may be switched individually for each item of data. For example, in a case where the data volume of the image data to be processed is less than a predetermined threshold value, the acquisition unit 20 acquires the image data itself from the server 12. The display controller 28 causes the display unit of the UI 16 to display a thumbnail image for the image data. In a case where the data volume of the image data to be processed is greater than or equal to the threshold value, if the sum total of the data volume of the design data relating to the image data and the character recognition result information of the image data is less than the threshold value, the acquisition unit 20 acquires the design data and the character recognition result information from the server 12. The display controller 28 extracts template image data from the design data, combines the template image data and the character information included in the character recognition result information, and generates thumbnail image data for the template image data combined with the character information. The display controller 28 causes the display unit of the UI 16 to display a thumbnail image that is based on the aforementioned thumbnail image data, as a thumbnail image for the image data in question. In a case where the sum total of the data volume of the design data and the character recognition result information is greater than or equal to the threshold value, the acquisition unit 20 acquires the design data from the server 12. The display controller 28 generates thumbnail image data for template image data included in the design data, and causes the display unit of the UI 16 to display a thumbnail image that is based on the thumbnail image data, as a thumbnail image for the image data in question.

(3-2-5) Example 5 of the Second Acquisition Mode

Example 5 of the second acquisition mode will be described in detail with reference to FIG. 14 hereinafter.

Figure 14:
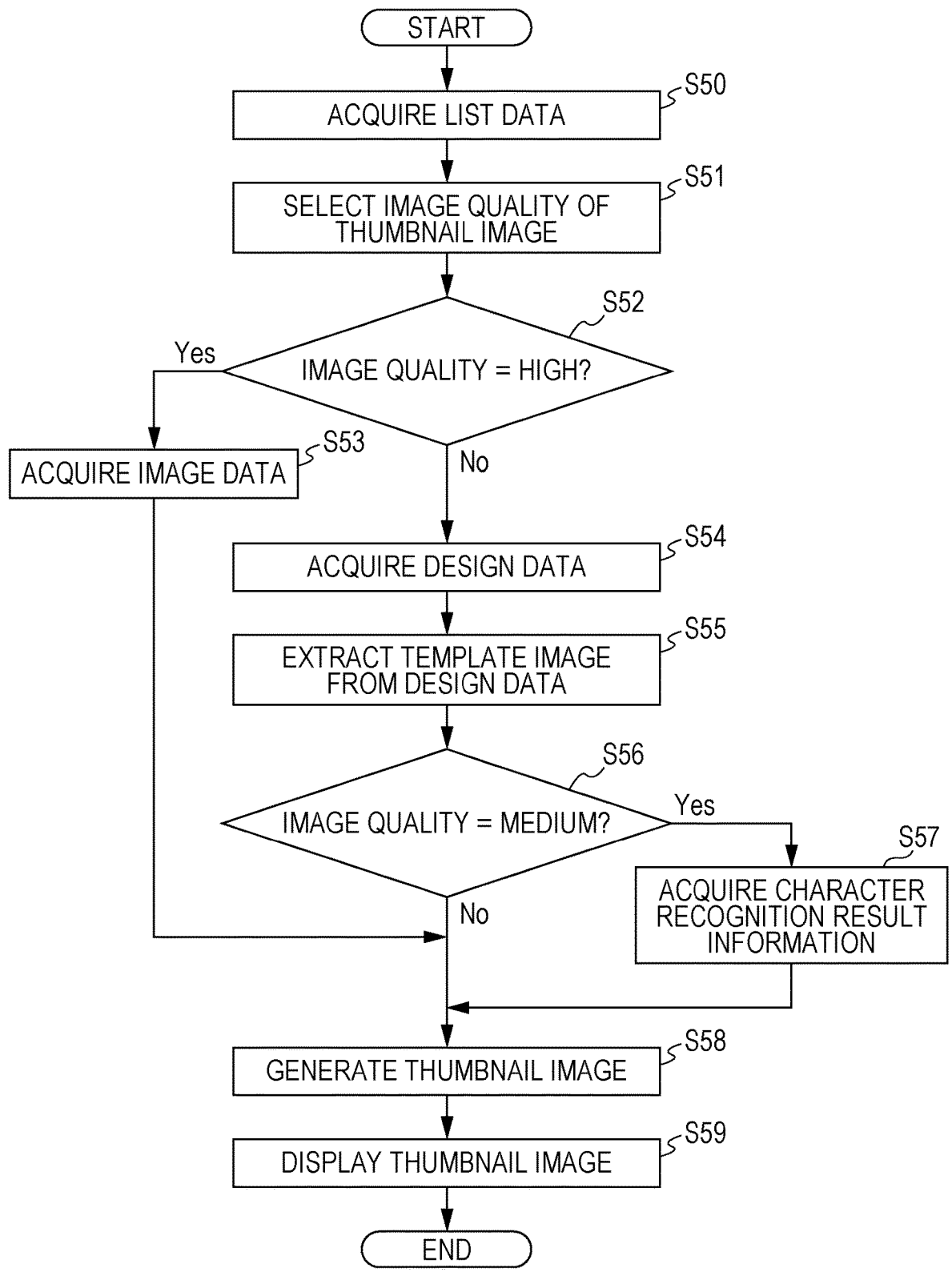
FIG. 14 is a drawing depicting a flowchart indicating processing according to example 5 of the second acquisition mode.

FIG. 14 depicts a flowchart indicating processing according to example 5. In example 5, the image quality for a thumbnail image is selected for each item of image data.

First, similar to step S01 in FIG. 8, the acquisition unit 20 acquires list data from the server 12 (S50).

Next, the user selects the image quality for a thumbnail image for each item of image data using the UI 16 (S51).

Figure 15:
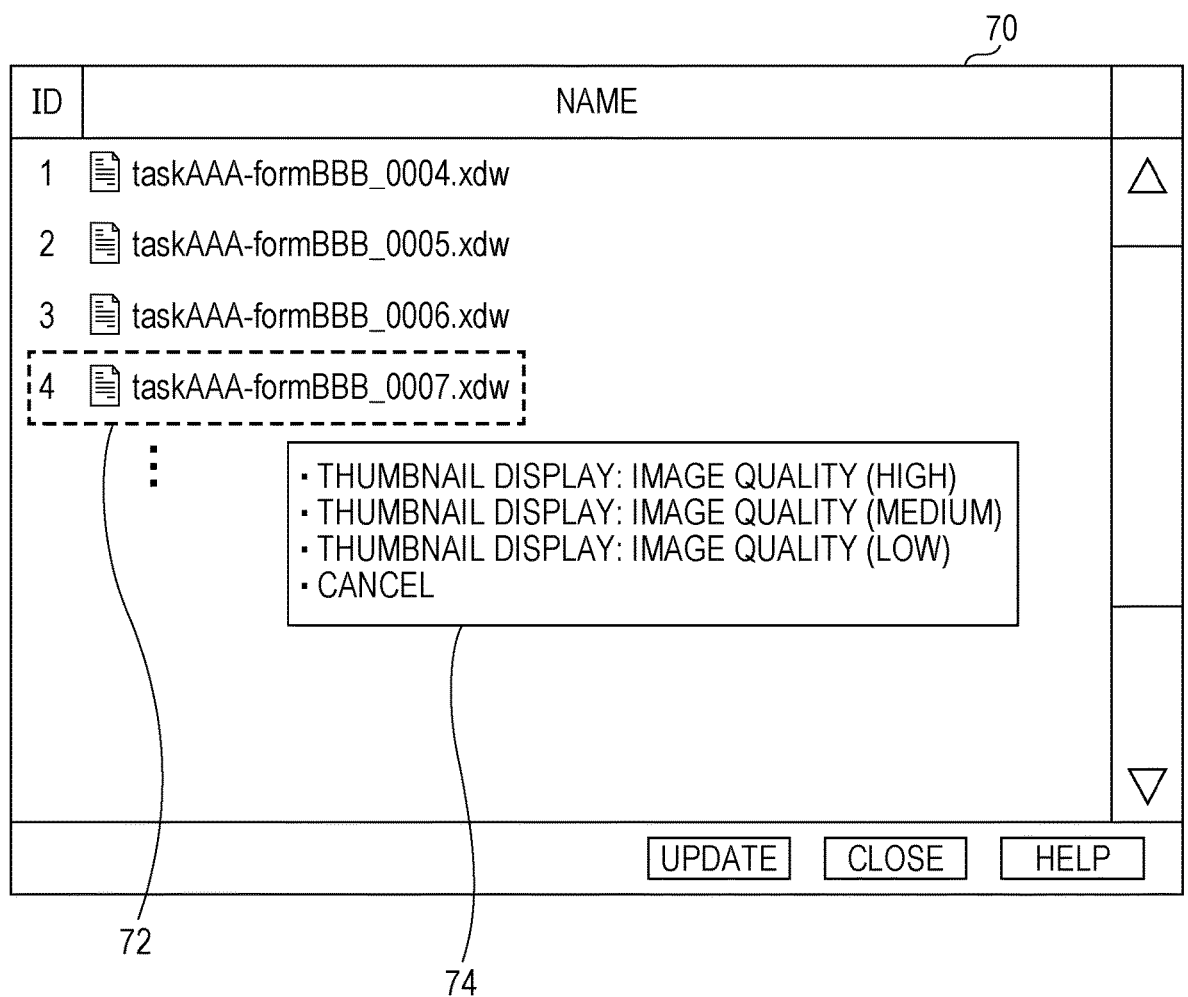
FIG. 15 is a drawing depicting an example of a screen.

For example, the display controller 28 causes the display unit of the UI 16 to display list data that is based on the list data acquired in step S50. For example, as depicted in FIG. 15, a screen 70 that displays a list is displayed on the display unit. The screen 70 displays information indicating the name of each item of image data included in the list.

In the example depicted in FIG. 15, image data having the ID "4" is selected by the user, as indicated by reference number 72. In a case where the user has issued a display instruction for an image quality selection window using the UI 16, the display controller 28 causes an image quality selection window 74 to be displayed on the screen 58. For example, the image quality selection window 74 is displayed by a right click of a mouse.

A list of image qualities for a thumbnail image is displayed within the image quality selection window 74, and an image quality selected by the user from among the list is set as an image quality for the thumbnail image data of the image data selected by the user. In the example depicted in FIG. 15, the image quality for the thumbnail image data of the image data having the ID "4" is selected by the user.

The image quality for thumbnail image data is selected by the user on the screen 70 also for other items of image data. It should be noted that the image quality for thumbnail image data of image data for which an image quality is not selected by the user is set to a predetermined image quality. The predetermined image quality is a low image quality or medium image quality, for example. It goes without saying that the predetermined image quality may be changed by the user or the like.

In a case where a high image quality has been selected by the user (S52: yes), the acquisition unit 20 acquires, from the server 12, the image data to be processed (S53). Next, the display controller 28 generates thumbnail image data for the image data acquired by the acquisition unit 20 (S58).

In a case where a high image quality has not been selected by the user (S52: no), if design data relating to the image data to be processed has not been acquired, similar to step S04 in FIG. 8, the acquisition unit 20 acquires the design data from the server 12 (S54). In a case where the design data has been acquired, the acquisition unit 20 does not acquire the design data in question again.

Next, the display controller 28 extracts template image data from the design data (S55).

Next, in a case where a medium image quality has been selected by the user (S56: yes), the acquisition unit 20 acquires, from the server 12, character recognition result information associated with the image data to be processed (S57).

Next, similar to step S16 in FIG. 10, the display controller 28 combines the character information included in the character recognition result information with the template image data, and generates thumbnail image data for the template image data combined with the character information, as thumbnail image data of the image data to be processed (S58).

In a case where a medium image quality has not been selected by the user (S56: no), that is, in a case where a low image quality has been selected by the user, the display controller 28 generates thumbnail image data for the template image data (S58).

The display controller 28 causes the display unit of the UI 16 to display a thumbnail image generated as described above (S59).

(3-2-6) Example 6 of the Second Acquisition Mode

Example 6 of the second acquisition mode will be described hereinafter. Information for displaying an image that indicates the features of image data indicating a completed form may be image data that is representative of an image data group to which the image data in question belongs. Image data that is representative of an image data group shall be referred to as "representative image data" hereinafter. An image that indicates the features of image data indicating a completed form is a thumbnail image of representative image data.

For example, one or more items of image data indicating a completed form and associated with the same task name and the same form name belong to the same image data group. The acquisition unit 20 acquires, from the server 12, representative image data from among the one or more items of image data associated with the same task name and the same form name. For example, the acquisition unit 20 classifies multiple items of image data included in the list into image data groups on the basis of the task names and the form names. Image data associated with the same task name and the same form name are classified into the same image data group. For example, multiple items of image data associated with the task name "AAA" and the form name "BBB" are classified into the same image data group.

For each image data group, the acquisition unit 20 determines one item of image data included in the image data group as being representative image data, and acquires the representative image data from the server 12. The representative image data may be image data designated by the user from among one or more items of image data included in the same image data group, may be image data arranged in a predetermined position in the list (for example, image data displayed in the highest position in the list), may be image data having the lowest data volume from among the one or more items of image data, or may be image data automatically selected in a random manner.

For example, the image data having the name "taskAAA-formBBB_0004" and the image data having the name "taskAAA-formBBB_0005" are associated with the same task name and the same form name, and therefore belong to the same image data group. In this case, the acquisition unit 20 determines one item of image data included in the image data group as being representative image data, and acquires the representative image data from the server 12. For example, image data having the name "taskAAA-formBBB_0004" is determined as representative image data, and the acquisition unit 20 acquires the representative image data from the server 12.

For each image data group, the display controller 28 generates thumbnail image data for the representative image data acquired by the acquisition unit 20. For each image data group, the display controller 28 causes the display unit of the UI 16 to display a thumbnail image of the representative image data for the image data group, as a thumbnail image of each item of image data in the image data group.

For example, in a case where 100 items of image data associated with the task name "AAA" and the form name "BBB" are included in the list, one image data group is formed by the 100 items of image data. The acquisition unit 20 determines one item of image data included in the image data group as being representative image data, and acquires the representative image data from the server 12. The display controller 28 generates thumbnail image data for the representative image data. That thumbnail image data is used as thumbnail image data for each of the aforementioned 100 items of image data. That is, 100 thumbnail images are displayed as thumbnail images of each of the aforementioned 100 items of image data. The 100 thumbnail images are thumbnail images of the representative image data, and are all the same image. Furthermore, the display controller 28 causes the display unit to display each thumbnail image with the name of the respective item of image data being associated with the respective thumbnail image.

If reference is made to FIG. 9, the thumbnail image of the representative image data is displayed instead of the thumbnail images 62 and 64 and the like. Furthermore, the name of each item of image data is displayed in association with a thumbnail image, similar to the example depicted in FIG. 9.

(4) Processing to Switch the Acquisition Mode

Processing to switch the acquisition mode will be described in detail hereinafter.

(4-1) Processing to Switch the Acquisition Mode in Accordance with a User Instruction Processing to switch the acquisition mode in accordance with a user instruction will be described hereinafter. First, the acquisition unit 20 acquires the aforementioned list data from the server 12. In a case where the user has designated a task name and a form name using the UI 16, the acquisition unit 20 acquires, from the server 12, list data indicating a list of image data associated with the designated task name and form name. Furthermore, in a case where the user has designated a specific storage area (for example, a folder or the like) in the storage unit 32 using the UI 16, the acquisition unit 20 acquires list data indicating a list of image data stored in the specific storage area.

The display controller 28 causes the display unit of the UI 16 to display a list. A list of names of image data is thereby displayed on the display unit. For example, the screen 70 depicted in FIG. 15 is displayed on the display unit.

The user refers to the list displayed on the display unit and designates the first acquisition mode or the second acquisition mode for each item of image data using the UI 16.

For example, it is assumed that the first acquisition mode is designated for image data having the name "taskAAA-formBBB_0004", and the second acquisition mode is designated for image data having the name "taskAAA-formBBB_0006".

The acquisition unit 20 acquires the attribute information of the image data having the name "taskAAA-formBBB_0004" from the server 12. The display controller 28 causes the display unit of the UI 16 to display the attribute information acquired by the acquisition unit 20, for the image data having the name "taskAAA-formBBB_0004".

Furthermore, the acquisition unit 20 executes any of the aforementioned examples 1 to 6 of the second acquisition mode on the image data having the name "taskAAA-formBBB_0006", and thereby acquires, from the server 12, information for displaying an image that indicates the features of the image data in question. The display controller 28 causes the display unit of the UI 16 to display a thumbnail image for the image data having the name "taskAAA-formBBB_0005", in accordance with any of the aforementioned examples 1 to 6. As described above, as the thumbnail image, a thumbnail image of template image data, a thumbnail image of representative image data, or a thumbnail image of the image data in question is displayed. Furthermore, in a case where character recognition result information has been acquired by the acquisition unit 20, a thumbnail image of template image data combined with character information is displayed.

When described from the viewpoint of the display mode, the display controller 28 executes the first display mode for the image data having the name "taskAAA-formBBB_0004", and executes the second display mode for the image data having the name "taskAAA-formBBB_0006".

FIG. 16 depicts a display example of attribute information and thumbnail images. A screen 76 is displayed on the display unit of the UI 16.

For example, the first acquisition mode is designated for image data having the name "taskAAA-formBBB_0004" and for image data having the name "taskAAA-formBBB_0005". That is, the first display mode is designated for these items of image data.

Furthermore, the second acquisition mode is designated for image data having the name "taskAAA-formBBB_0006" and for image data having the name "taskAAA-formBBB_0007". That is, the second display mode is designated for these items of image data.

The display controller 28 divides the screen 76 into a first display region 78 that is a display region for the first display mode and a second display region 80 that is a display region for the second display mode. The attribute information acquired by executing the first acquisition mode is displayed within the first display region 78, and the thumbnail images generated by executing the second acquisition mode are displayed within the second display region 80, by the display controller 28.

Information indicating a name, information indicating an update date/time, information indicating the size of data, information indicating a data format, and the like are displayed as attribute information for the image data having the name "taskAAA-formBBB_0004" and the image data having the name "taskAAA-formBBB_0005".

A thumbnail image 82 is an image that is displayed as a thumbnail image of the image data having the name "taskAAA-formBBB_0006". A thumbnail image 84 is an image that is displayed as a thumbnail image of the image data having the name "taskAAA-formBBB_0007". The thumbnail images 82 and 84 are thumbnail images of template image data, and are images that do not include character recognition result information, for example. For the image data having the name "taskAAA-formBBB_0006" and the image data having the name "taskAAA-formBBB_0007", the task names are the same as each other and the form names are the same as each other, and therefore the thumbnail images 82 and 84 are the same image.

In a case where attribute information and thumbnail images are displayed on the screen 76, if a display mode switching instruction has been issued by the user, the switching unit 22 may switch the display mode in accordance with the user instruction. For example, in a case where the user has designated the image data having the name "taskAAA-formBBB_0004" on the screen 76 and instructed execution of the second display mode, the switching unit 22 switches the display mode from the first display mode to the second display mode. In this case, the acquisition unit 20 executes any of the examples 1 to 6, and the display controller 28 displays a thumbnail image within the second display region 80 instead of attribute information. Similarly, in a case where the user has instructed execution of the first display mode for image data displayed in accordance with the second display mode, the attribute information of the image data in question is displayed within the first display region 78 instead of a thumbnail image.

In the example depicted in FIG. 16, attribute information and thumbnail images are displayed mixed together; however, it should be noted that the first acquisition mode may be executed for all image data for attribute information to be displayed for all image data, and the second acquisition mode may be executed for all image data for thumbnail images to be displayed for all image data.

Thumbnail images of template image data combined with character information may be displayed. Thumbnail images 86 and 88 depicted in FIG. 17 are thumbnail images of template image data combined with character information. For example, character information extracted from the image data having the name "taskAAA-formBBB_0006" is combined with template image data, and the thumbnail image 86 is generated based on the template image data combined with the character information. Similarly, character information extracted from the image data having the name "taskAAA-formBBB_0007" is combined with template image data, and the thumbnail image 88 is generated based on the template image data combined with the character information.

Furthermore, a thumbnail image of image data indicating a completed form or a thumbnail image of representative image data may be displayed. Thumbnail images 90 and 92 depicted in FIG. 18 are thumbnail images of representative image data of an image data group associated with the task name "AAA" and the form name "BBB". As another example, the thumbnail image 90 may be a thumbnail image of image data having the name "taskAAA-formBBB_0006". Similarly, the thumbnail image 92 may be a thumbnail image of image data having the name "taskAAA-formBBB_0007".

Character strings and the like that have actually been entered into a form are indicated in thumbnail images of image data indicating a completed form and thumbnail images of representative image data. Meanwhile, such character strings and the like are not indicated in thumbnail images of template image data. For that reason, by using thumbnail images of template images, security regarding character strings and the like entered into forms is improved compared to the case where thumbnail images of image data indicating a completed form and thumbnail images of representative image data are used.

Furthermore, a thumbnail image for display purposes may be used. A thumbnail image for display purposes is, for example, an image configured from a thumbnail image of template image data, and character strings indicating features of image data, superposed on the thumbnail image. FIG. 19 depicts an example of a thumbnail image for display purposes. A thumbnail image 94 is an image configured from a thumbnail image of template image data associated with the task name "AAA" and the form name "BBB", and a character string indicating features of image data (for example, "Task Name AAA, Form Name "BBB"), superposed on the thumbnail image. The same is true also for thumbnail image 96.

(4-2) Processing to Switch the Acquisition Mode in Accordance with a Switching Condition Processing to switch the acquisition mode in accordance with a switching condition will be described hereinafter. First, the acquisition unit 20 acquires the aforementioned list data from the server 12. In a case where the user has designated a task name and a form name using the UI 16, the acquisition unit 20 acquires, from the server 12, list data indicating a list of image data associated with the designated task name and form name. Furthermore, in a case where the user has designated a specific storage area (for example, a folder or the like) in the storage unit 32 using the UI 16, the acquisition unit 20 acquires list data indicating a list of image data stored in the specific storage area. Information indicating the resolution of each item of image data is included in the list data.

The display controller 28 may cause the display unit of the UI 16 to display a list. A list of names of image data is thereby displayed on the display unit. For example, the screen 70 depicted in FIG. 15 is displayed on the display unit.

(4-2-1) Processing to Switch the Acquisition Mode in Accordance with the Resolution of Image Data Processing to switch the acquisition mode in accordance with the resolution of image data will be described hereinafter.

For each item of image data to be processed, the switching unit 22 switches between the first acquisition mode and the second acquisition mode in accordance with the resolution of the image data to be processed.

In a case where the resolution of the image data to be processed is greater than or equal to a predetermined threshold value, the switching unit 22 switches the acquisition mode to the first acquisition mode. In this case, the acquisition unit 20 acquires the attribute information of the image data to be processed, from the server 12. The display controller 28 causes the display unit of the UI 16 to display the attribute information of the image data to be processed. The threshold value may be changed by the user.

For example, in a case where the resolution of the image data having the name "taskAAA-formBBB_0004" is greater than or equal to the threshold value, the acquisition unit 20 acquires the attribute information of the image data from the server 12. The display controller 28 causes the display unit of the UI 16 to display the attribute information of the image data.

In a case where the resolution of the image data to be processed is less than the threshold value, the switching unit 22 switches the acquisition mode to the second acquisition mode. In this case, the acquisition unit 20 executes any of the aforementioned examples 1 to 6 on the image data to be processed, and thereby acquires, from the server 12, information for displaying an image that indicates the features of the image data in question. The display controller 28 causes the display unit of the UI 16 to display a thumbnail image of the image data to be processed, in accordance with any of the aforementioned examples 1 to 6.

For example, in a case where the resolution of the image data having the name "taskAAA-formBBB_0005" is less than the threshold value, a thumbnail image is displayed on the display unit of the UI 16 for the image data in question.

For each item of image data, the first acquisition mode or the second acquisition mode is executed in accordance with the resolution of the image data, and attribute information or a thumbnail image is thereby displayed for each item of image data, as depicted in any of FIGS. 16 to 19, for example. It goes without saying that there are also cases where the first acquisition mode is executed for all image data and where the second acquisition mode is executed for all image data.

Generally, the data volume of image data having a resolution that is greater than or equal to the threshold value is large compared to the data volume of image data having a resolution that is less than the threshold value. For image data having a resolution that is greater than or equal to the threshold value, attribute information is acquired without information for displaying a thumbnail image being acquired, and therefore the communication load decreases compared to the case where information for displaying a thumbnail image is acquired. For image data having a resolution that is less than the threshold value, information for displaying a thumbnail image is acquired, and therefore it becomes easy for the user to comprehend the content of the image data compared to the case where the attribute information is acquired.

For each item of data to be processed, the switching unit 22 may switch between the first display mode and the second display mode in accordance with the resolution of the image data to be processed.

In a case where the resolution of the image data to be processed is greater than or equal to the threshold value, the switching unit 22 switches the display mode to the first display mode. In this case, the display controller 28 causes the display unit of the UI 16 to display attribute information of the image data to be processed. In a case where the acquisition unit 20 has already acquired the attribute information from the server 12, the display controller 28 causes the display unit of the UI 16 to display the attribute information that has already been acquired. In a case where the acquisition unit 20 has not acquired the attribute information from the server 12, the acquisition unit 20 acquires the attribute information from the server 12, and the display controller 28 causes the display unit of the UI 16 to display the attribute information.

In a case where the resolution of the image data to be processed is less than the threshold value, the switching unit 22 switches the display mode to the second display mode. In this case, the display controller 28 causes the display unit of the UI 16 to display a thumbnail image of the image data to be processed, in accordance with any of the aforementioned examples 1 to 6. In a case where the acquisition unit 20 has already acquired, from the server 12, information for displaying an image that indicates the features of the image data to be processed, the display controller 28 causes the display unit of the UI 16 to display a thumbnail image that is based on the information that has already been acquired. In a case where the acquisition unit 20 has not acquired the information, the acquisition unit 20 acquires the information from the server 12, and the display controller 28 causes the display unit of the UI 16 to display a thumbnail image that is based on the information.

(4-2-2) Processing to Switch the Acquisition Mode in Accordance with the Data Volume of Image Data Processing to switch the acquisition mode in accordance with the data volume of image data will be described hereinafter.

For each item of image data to be processed, the switching unit 22 switches between the first acquisition mode and the second acquisition mode in accordance with the data volume of the image data to be processed.

In a case where the data volume of the image data to be processed is greater than or equal to a predetermined threshold value, the switching unit 22 switches the acquisition mode to the first acquisition mode. In this case, the acquisition unit 20 acquires the attribute information of the image data to be processed, from the server 12. The display controller 28 causes the display unit of the UI 16 to display the attribute information of the image data to be processed. The threshold value may be changed by the user.

For example, in a case where the data volume of the image data having the name "taskAAA-formBBB_0004" is greater than or equal to the threshold value, the acquisition unit 20 acquires the attribute information of the image data from the server 12. The display controller 28 causes the display unit of the UI 16 to display the attribute information of the image data.

In a case where the data volume of the image data to be processed is less than the threshold value, the switching unit 22 switches the acquisition mode to the second acquisition mode. In this case, the acquisition unit 20 executes any of the aforementioned examples 1 to 6 on the image data to be processed, and thereby acquires, from the server 12, information for displaying an image that indicates the features of the image data in question. The display controller 28 causes the display unit of the UI 16 to display a thumbnail image of the image data to be processed, in accordance with any of the aforementioned examples 1 to 6.

For example, in a case where the data volume of the image data having the name "taskAAA-formBBB_0005" is less than the threshold value, a thumbnail image is displayed on the display unit of the UI 16 for the image data in question.

For each item of image data, the first acquisition mode or the second acquisition mode is executed in accordance with the data volume of the image data, and attribute information or a thumbnail image is thereby displayed for each item of image data, as depicted in any of FIGS. 16 to 19, for example. It goes without saying that there are also cases where the first acquisition mode is executed for all image data and where the second acquisition mode is executed for all image data.

For image data having a data volume that is greater than or equal to the threshold value, attribute information is acquired without information for displaying a thumbnail image being acquired, and therefore the communication load decreases compared to the case where information for displaying a thumbnail image is acquired. For image data having a data volume that is less than the threshold value, information for displaying a thumbnail image is acquired, and therefore it becomes easy for the user to comprehend the content of the image data compared to the case where the attribute information is acquired.

For each item of data to be processed, the switching unit 22 may switch between the first display mode and the second display mode in accordance with the data volume of the image data to be processed.

In a case where the data volume of the image data to be processed is greater than or equal to the threshold value, the switching unit 22 switches the display mode to the first display mode. In this case, the display controller 28 causes the display unit of the UI 16 to display attribute information of the image data to be processed. In a case where the acquisition unit 20 has already acquired the attribute information from the server 12, the display controller 28 causes the display unit of the UI 16 to display the attribute information that has already been acquired. In a case where the acquisition unit 20 has not acquired the attribute information from the server 12, the acquisition unit 20 acquires the attribute information from the server 12, and the display controller 28 causes the display unit of the UI 16 to display the attribute information.

In a case where the data volume of the image data to be processed is less than the threshold value, the switching unit 22 switches the display mode to the second display mode. In this case, the display controller 28 causes the display unit of the UI 16 to display a thumbnail image of the image data to be processed, in accordance with any of the aforementioned examples 1 to 6. In a case where the acquisition unit 20 has already acquired, from the server 12, information for displaying an image that indicates the features of the image data to be processed, the display controller 28 causes the display unit of the UI 16 to display a thumbnail image that is based on the information that has already been acquired. In a case where the acquisition unit 20 has not acquired the information, the acquisition unit 20 acquires the information from the server 12, and the display controller 28 causes the display unit of the UI 16 to display a thumbnail image that is based on the information.

(4-2-3) Processing to Switch the Acquisition Mode in Accordance with the Type of Data Processing to switch the acquisition mode in accordance with the type of data will be described hereinafter.

For each item of data to be processed, the switching unit 22 switches between the first acquisition mode and the second acquisition mode in accordance with the type of data to be processed.

In a case where the type of data to be processed is a first type, the switching unit 22 switches the acquisition mode to the first acquisition mode. In this case, the acquisition unit 20 acquires the attribute information of the data to be processed, from the server 12. The display controller 28 causes the display unit of the UI 16 to display attribute information of the data to be processed.

In a case where the type of data to be processed is a second type that is different from the first type, the switching unit 22 switches the acquisition mode to the second acquisition mode. In this case, the acquisition unit 20 acquires information for displaying an image that indicates the features of the data to be processed, from the server 12. The display controller 28 causes the display unit of the UI 16 to display a thumbnail image of the data to be processed.

The first type of data is assumed to have a larger data volume compared to the second type of data. For example, image data and speech data correspond to an example of the first type of data. Document data corresponds to an example of the second type of data.

In a case where the data to be processed is image data, the acquisition unit 20 acquires attribute information of the image data from the server 12. In a case where the data to be processed is speech data, the acquisition unit 20 acquires attribute information of the speech data from the server 12. The display controller 28 causes the display unit of the UI 16 to display these items of attribute information.

In a case where the data to be processed is document data, the acquisition unit 20 acquires information for displaying a thumbnail image of the document data from the server 12. The information for displaying a thumbnail image of the document data may be the document data itself, may be pre-generated template image data indicating the layout of the document data, or may be template image data for display purposes schematically indicating the document data, for example. The display controller 28 generates thumbnail image data on the basis of the information for displaying a thumbnail image of the document data, and causes the display unit of the UI 16 to display a thumbnail image that is based on the thumbnail image data. It should be noted that the thumbnail image data for the document data may be generated by the server 12. In this case, the acquisition unit 20 acquires, from the server 12, the thumbnail image data as information for displaying a thumbnail image of the document data. The display controller 28 causes the display unit of the UI 16 to display a thumbnail image that is based on the thumbnail image data.

For the first type of data, attribute information is acquired without information for displaying a thumbnail image being acquired, and therefore the communication load decreases compared to the case where information for displaying a thumbnail image is acquired. For the second type of data, information for displaying a thumbnail image is acquired, and therefore it becomes easy for the user to comprehend the content of the data compared to the case where the attribute information is acquired.

(4-2-4) Processing to Switch the Acquisition Mode in Accordance with the Data Volume of all Image Data to be Processed Processing to switch the acquisition mode in accordance with the data volume of all image data to be processed will be described hereinafter. All image data to be processed corresponds to an example of all image data to be acquired.

In a case where the data volume of all image data included in the list is greater than or equal to a predetermined threshold value, the switching unit 22 switches the acquisition mode to the first acquisition mode. In this case, the acquisition unit 20 acquires attribute information for all image data from the server 12. The display controller 28 causes the display unit of the UI 16 to display the attribute information for all image data.

In a case where the data volume of all image data included in the list is less than the threshold value, the switching unit 22 switches the acquisition mode to the second acquisition mode. In this case, the acquisition unit 20 executes any of the aforementioned examples 1 to 6 on all image data. The display controller 28 causes the display unit of the UI 16 to display thumbnail images for all image data in accordance with any of the aforementioned examples 1 to 6.

It should be noted that the acquisition mode may be switched according to the data volume of all data also for data other than image data (for example, speech data and document data).

The functions of each unit of the terminal apparatus 10 and the server 12 are realized by a collaboration between hardware and software, as an example. Specifically, the terminal apparatus 10 and the server 12 are each provided with one or more processors such as CPUs that are not depicted. The functions of each unit of the terminal apparatus 10 and the server 12 are realized by the one or more processors reading and executing programs stored in a storage apparatus that is not depicted. The programs are stored in the storage apparatus by way of a recording medium such as a CD or DVD or by way of a communication path such as a network. As another example, the functions of each unit of the terminal apparatus 10 and the server 12 may be realized by a hardware resource such as a processor, an electronic circuit, or an ASIC (application-specific integrated circuit), for example. An apparatus such as a memory may be used for that implementation. As yet another example, the functions of each unit of the terminal apparatus 10 and the server 12 may be realized by a DSP (digital signal processor), an FPGA (field programmable gate array), or the like.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor that is configured to:
acquire information from an external apparatus that stores data; and
for each item of the data, switch between a first mode in which attribute information of the data is acquired from the external apparatus, and a second mode in which, from the external apparatus, information for displaying an image is acquired that indicates a feature of the data,
wherein the information for displaying the image that indicates the feature of the data includes the image data indicating the layout and character information extracted from the image using a character recognition process on the image.

2. The information processing apparatus according to claim 1,
wherein the attribute information includes a character string expressing an attribute of the data.

3. The information processing apparatus according to claim 1,
wherein the information for displaying the image that indicates the feature of the data is image data that is representative of a data group to which the data belongs.

4. The information processing apparatus according to claim 2,
wherein the information for displaying the image that indicates the feature of the data is image data that is representative of a data group to which the data belongs.

5. The information processing apparatus according to claim 1,
wherein the processor switches between the first mode and the second mode for each item of the data based on a user instruction.

6. The information processing apparatus according to claim 2,
wherein the processor switches between the first mode and the second mode for each item of the data based on a user instruction.

7. The information processing apparatus according to claim 3,
wherein the processor switches between the first mode and the second mode for each item of the data based on a user instruction.

8. The information processing apparatus according to claim 4,
wherein the processor switches between the first mode and the second mode for each item of the data based on a user instruction.

9. The information processing apparatus according to claim 1,
wherein the processor switches between the first mode and the second mode for each item of the data based on a resolution of the data, a volume of the data, or a type of the data.

10. The information processing apparatus according to claim 1,
wherein the processor switches between the first mode and the second mode based on a data volume of all data to be acquired.

11. An information processing apparatus comprising:
a display controller that causes a display to display information; and
a processor that, for each item of data, switches between a first mode in which the display controller causes the display to display attribute information of the data, and a second mode in which the display controller causes the display to display an image indicating a feature of the data,
wherein information for displaying the image that indicates the feature of the data includes the image data indicating the layout and character information extracted from the image using a character recognition process on the image.

12. A non-transitory computer readable medium storing a program causing a computer to execute a process for processing information, the process comprising:
acquiring information from an external apparatus that stores data; and
for each item of the data, switching between a first mode in which attribute information of the data is acquired from the external apparatus, and a second mode in which, from the external apparatus, information for displaying an image is acquired that indicates a feature of the data,
wherein the information for displaying the image that indicates the feature of the data includes the image data indicating the layout and character information extracted from the image using a character recognition process on the image.

* * * * *